United States Patent
Hosseini et al.

(10) Patent No.: US 11,218,350 B2
(45) Date of Patent: Jan. 4, 2022

(54) DOWNLINK DEMODULATION REFERENCE SIGNAL SHARING FOR SHORT TRANSMISSION TIME INTERVALS

(71) Applicant: QUALCOMM Incorporated, San Diego, CA (US)

(72) Inventors: Seyedkianoush Hosseini, San Diego, CA (US); Wanshi Chen, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 16/153,816

(22) Filed: Oct. 7, 2018

(65) Prior Publication Data

US 2019/0109746 A1    Apr. 11, 2019

Related U.S. Application Data

(60) Provisional application No. 62/570,083, filed on Oct. 9, 2017.

(51) Int. Cl.
*H04L 27/26* (2006.01)
*H04L 5/00* (2006.01)
(Continued)

(52) U.S. Cl.
CPC .......... *H04L 27/2613* (2013.01); *H04L 5/005* (2013.01); *H04L 5/0051* (2013.01);
(Continued)

(58) Field of Classification Search
None
See application file for complete search history.

(56) References Cited

U.S. PATENT DOCUMENTS

2014/0119322 A1\*  5/2014  Wang ................. H04W 52/325
                                                                370/329
2016/0037550 A1\*  2/2016  Barabell ............. H04W 72/046
                                                                455/450
(Continued)

FOREIGN PATENT DOCUMENTS

EP         3383111 A1    10/2018
WO    WO-2017110959 A1   6/2017

OTHER PUBLICATIONS

Ericsson: "DL DMRS Design for for Short TTI", 3GPP Draft; R1-1708866, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017 May 14, 2017, XP051274049, Retrieved from the Internet: URL:http://www.3gpp.org/ftp/Meetings_3GPP_SYNC/RAN1/Docs/ [retrieved on May 14, 2017], 15 pages.
(Continued)

*Primary Examiner* — Saad Khawar
(74) *Attorney, Agent, or Firm* — QUALCOMM Incorporated

(57) ABSTRACT

Methods, systems, and devices for wireless communications are described. In some wireless communications systems, a base station may communicate with a user equipment (UE) during short transmission time intervals (sTTIs). The base station may transmit reference signals in an sTTI for the UE to use to perform channel estimation for demodulating the data received in the sTTI. As described herein, a base station may transmit reference signals in a subset of the sTTIs used for downlink communications with the UE. The UE may receive the reference signals in the subset of the sTTIs and use these reference signals to perform channel estimation for demodulating data received in other sTTIs. In some cases, the UE may use the reference signals in one or more previous sTTIs in combination with the reference signals (Continued)

received in a current sTTI to perform channel estimation for demodulating data received in the current sTTI.

35 Claims, 16 Drawing Sheets

(51) Int. Cl.
    *H04W 72/04*     (2009.01)
    *H04W 72/12*     (2009.01)
    *H04L 25/02*     (2006.01)

(52) U.S. Cl.
    CPC .......... *H04L 5/0078* (2013.01); *H04L 5/0091* (2013.01); *H04L 25/0224* (2013.01); *H04W 72/042* (2013.01); *H04W 72/0446* (2013.01); *H04W 72/0473* (2013.01); *H04W 72/1278* (2013.01); *H04L 5/0053* (2013.01); *H04L 25/0204* (2013.01)

(56) References Cited

U.S. PATENT DOCUMENTS

| | | | |
|---|---|---|---|
| 2018/0279344 A1* | 9/2018 | Bagheri | H04W 72/044 |
| 2019/0349163 A1* | 11/2019 | Shao | H04L 5/0091 |
| 2020/0059905 A1* | 2/2020 | Tang | H04B 7/0486 |

OTHER PUBLICATIONS

International Search Report and Written Opinion—PCT/US2018/054870—ISA/EPO—dated Jan. 21, 2019.

Samsung: "DL DMRS Design", 3GPP Draft; R1-1717541—DL DMRS Design, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017, XP051340728, Retrieved from the Internet: URL:http://www.3gpp.org/ftp/Meetings_3GPP_SYNC/RAN1/Docs/ [retrieved on Oct. 8, 2017], 3 pages.

\* cited by examiner sTTI n-1
305-a sTTI n
305-b

310 — Ports 7 and 8
315 — Ports 9 and 10
320 — sPDSCH

300 sTTI n-1
405-a sTTI n
405-b

410 — Ports 7 and 8
415 — Ports 9 and 10
420 — sPDSCH

400

DOWNLINK DEMODULATION REFERENCE SIGNAL SHARING FOR SHORT TRANSMISSION TIME INTERVALS

CROSS REFERENCES

The present Application for Patent claims benefit of U.S. Provisional Patent Application No. 62/570,083 by HOSSEINI et al., entitled "DOWNLINK DEMODULATION REFERENCE SIGNAL SHARING FOR SHORT TRANSMISSION TIME INTERVALS," filed Oct. 9, 2017, assigned to the assignee hereof, and expressly incorporated by reference herein, in its entirety.

BACKGROUND

The following relates generally to wireless communication and more specifically to downlink demodulation reference signal (DMRS) sharing for short transmission time intervals (sTTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a base station may communicate with a UE during sTTIs on resources of a carrier. The base station may transmit control information to the UE in a shortened physical downlink control channel (sPDCCH) during an sTTI and the base station may transmit data to the UE in a shortened physical downlink shared channel (sPDSCH) during the sTTI. The base station may also transmit reference signals (e.g., DMRSs) to the UE during the sTTI and the UE may use the reference signals to perform channel estimation to correctly demodulate the data in the sTTI. Efficient techniques for transmitting reference signals within an sTTI may be desirable to reduce overhead in a wireless communications system.

SUMMARY

In some wireless communications systems, a base station may communicate with a user equipment (UE) during short transmission time intervals (sTTIs). The base station may transmit reference signals in an sTTI for the UE to use to perform channel estimation for demodulating the data received in the sTTI. As described herein, a base station may transmit reference signals in a subset of sTTIs within a demodulation reference signal (DMRS) sharing window used for downlink communications with the UE. The UE may receive the reference signals in the subset of the sTTIs and use these reference signals to perform channel estimation for demodulating data received in other sTTIs. In some cases, the base station may send an indicator to the UE indicating the presence of reference signals in one or more previous sTTIs and/or the current sTTI to perform channel estimation for demodulating data received in the current sTTI.

A method of wireless communication is described. The method may include receiving a first downlink transmission in a first sTTI, receiving a second downlink transmission in a second sTTI, identifying one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission, and demodulating the second downlink transmission based on the one of the set of DMRS configurations.

An apparatus for wireless communication is described. The apparatus may include a processor, memory in electronic communication with the processor, and instructions stored in the memory. The instructions may be executable by the processor to cause the apparatus to receive a first downlink transmission in a first sTTI, receive a second downlink transmission in a second sTTI, identify one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission, and demodulate the second downlink transmission based on the one of the set of DMRS configurations.

Another apparatus for wireless communication is described. The apparatus may include means for receiving a first downlink transmission in a first sTTI, receiving a second downlink transmission in a second sTTI, identifying one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission, and demodulating the second downlink transmission based on the one of the set of DMRS configurations.

A non-transitory computer-readable medium storing code for wireless communication is described. The code may include instructions executable by a processor to receive a first downlink transmission in a first sTTI, receive a second downlink transmission in a second sTTI, identify one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission, and demodulate the second downlink transmission based on the one of the set of DMRS configurations.

In some examples of the method, apparatuses, and non-transitory computer-readable medium described herein, the identifying the one of the set of DMRS configurations includes identifying the at least one combined DMRS configuration based on a number of layers used for the second downlink transmission being above a layer threshold.

In some examples of the method, apparatuses, and non-transitory computer-readable medium described herein, the first sTTI and the second sTTI include a DMRS sharing window. In some examples of the method, apparatuses, and non-transitory computer-readable medium described herein, a number of layers used for the second downlink transmission may be above a layer threshold, and where a number of downlink transmissions in the DMRS sharing window including DMRS may be below a DMRS threshold. In some examples of the method, apparatuses, and non-transitory computer-readable medium described herein, a number of downlink transmissions in the DMRS sharing window including DMRS may be below a DMRS threshold.

In some examples of the method, apparatuses, and non-transitory computer-readable medium described herein, the first downlink transmission and the second downlink transmission may be received in adjacent sTTIs including DMRS. In some examples of the method, apparatuses, and non-transitory computer-readable medium described herein, the identifying the one of the set of DMRS configurations may include operations, features, means, or instructions for receiving control information in the second downlink transmission including an indicator of the one of the set of DMRS configurations.

Some examples of the method, apparatuses, and non-transitory computer-readable medium described herein may further include operations, features, means, or instructions for receiving, prior to receiving the second downlink transmission, a configuration selection indicator indicating a correspondence between a value for the indicator of the one of the set of DMRS configurations and a first combined DMRS configuration. In some examples of the method, apparatuses, and non-transitory computer-readable medium described herein, the correspondence between the value of the indicator and the first combined DMRS configuration may be based on an sTTI index associated with the first downlink transmission. In some examples of the method, apparatuses, and non-transitory computer-readable medium described herein, the correspondence between the value of the indicator and the first combined DMRS configuration may be based on a number of layers associated with the second downlink transmission.

Some examples of the method, apparatuses, and non-transitory computer-readable medium described herein may further include operations, features, means, or instructions for applying a second combined DMRS configuration based on an sTTI index associated with the second downlink transmission, the second combined DMRS configuration corresponding to a presence of DMRS in the second downlink transmission and a third downlink transmission corresponding to a third sTTI occurring prior to the second sTTI. Some examples of the method, apparatuses, and non-transitory computer-readable medium described herein may further include operations, features, means, or instructions for identifying a number of layers associated with the second downlink transmission and determining a first set of DMRS associated with the number of layers for the second downlink transmission based on the one of the set of DMRS configurations and DMRS in the first downlink transmission.

In some examples of the method, apparatuses, and non-transitory computer-readable medium described herein, a second number of layers associated with the first downlink transmission may be different than the number of layers associated with the second downlink transmission, and where the demodulating may include operations, features, means, or instructions for performing channel estimation for the number of layers associated with the second downlink transmission based on an energy per resource element power ratio between the first set of DMRS and data resource elements of the second downlink transmission that correspond to the number of layers associated with the second downlink transmission. In some examples of the method, apparatuses, and non-transitory computer-readable medium described herein, the energy per resource element ratio may be one.

Some examples of the method, apparatuses, and non-transitory computer-readable medium described herein may further include operations, features, means, or instructions for de-rating matching the second downlink transmission based on the first set of DMRS.

Some examples of the method, apparatuses, and non-transitory computer-readable medium described herein may further include operations, features, means, or instructions for determining a first frequency resource allocation for the first downlink transmission, determining a second frequency resource allocation for the second downlink transmission, where the second frequency resource allocation may be different than the first frequency resource allocation and identifying a first set of DMRS in the second downlink transmission based on the one of the set of DMRS configurations and frequency resources of the second frequency resource allocation that may be exclusive of the first frequency resource allocation.

Some examples of the method, apparatuses, and non-transitory computer-readable medium described herein may further include operations, features, means, or instructions for receiving a power ratio indicating a difference between an energy per resource element of a first set of DMRS in the first downlink transmission and an energy per resource element of a second set of DMRS in the second downlink transmission. In some examples of the method, apparatuses, and non-transitory computer-readable medium described herein, the second downlink transmission includes downlink control information, the identifying the one of the set of DMRS configurations based on the downlink control information.

A method of wireless communication is described. The method may include transmitting a first downlink transmission to a UE in a first sTTI, determining a DMRS configuration for the UE for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission, and transmitting the second downlink transmission to the UE in the second sTTI.

An apparatus for wireless communication is described. The apparatus may include a processor, memory in electronic communication with the processor, and instructions stored in the memory. The instructions may be executable by the processor to cause the apparatus to transmit a first downlink transmission to a UE in a first sTTI, determine a DMRS configuration for the UE for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission, and transmit the second downlink transmission to the UE in the second sTTI.

Another apparatus for wireless communication is described. The apparatus may include means for transmitting a first downlink transmission to a UE in a first sTTI, determining a DMRS configuration for the UE for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission, and transmitting the second downlink transmission to the UE in the second sTTI.

A non-transitory computer-readable medium storing code for wireless communication is described. The code may include instructions executable by a processor to transmit a first downlink transmission to a UE in a first sTTI, determine a DMRS configuration for the UE for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission, and transmit the second downlink transmission to the UE in the second sTTI.

In some examples of the method, apparatuses, and non-transitory computer-readable medium described herein, determining the DMRS configuration may include operations, features, means, or instructions for selecting the at least one combined DMRS configuration based on a number of layers used for the second downlink transmission being above a layer threshold.

In some examples of the method, apparatuses, and non-transitory computer-readable medium described herein, the first sTTI and the second sTTI include a DMRS sharing window. In some examples of the method, apparatuses, and non-transitory computer-readable medium described herein, a number of downlink transmissions in the DMRS sharing window including DMRS may be below a DMRS threshold. In some examples of the method, apparatuses, and non-transitory computer-readable medium described herein, one of two downlink transmissions in adjacent sTTIs includes DMRS.

In some examples of the method, apparatuses, and non-transitory computer-readable medium described herein, a number of layers used for the second downlink transmission may be above a layer threshold, and where a number of downlink transmissions in the DMRS sharing window including DMRS may be below a DMRS threshold.

Some examples of the method, apparatuses, and non-transitory computer-readable medium described herein may further include operations, features, means, or instructions for transmitting, to the UE in the second transmission, downlink control information including an indicator of the DMRS configuration. Some examples of the method, apparatuses, and non-transitory computer-readable medium described herein may further include operations, features, means, or instructions for transmitting, prior to transmitting the second downlink transmission, a configuration selection indicator indicating a correspondence between a value for the indicator of the DMRS configuration and a first combined DMRS configuration. In some examples of the method, apparatuses, and non-transitory computer-readable medium described herein, the correspondence between the value of the indicator and the first combined DMRS configuration may be based on an sTTI index associated with the first downlink transmission. In some examples of the method, apparatuses, and non-transitory computer-readable medium described herein, the correspondence between the value of the indicator and the first combined DMRS configuration may be based on a number of layers associated with the second downlink transmission.

Some examples of the method, apparatuses, and non-transitory computer-readable medium described herein may further include operations, features, means, or instructions for determining a second combined DMRS configuration based on an sTTI index associated with the second downlink transmission, the second combined DMRS configuration corresponding to a presence of DMRS in the second downlink transmission and a third downlink transmission corresponding to a third sTTI occurring prior to the third sTTI.

Some examples of the method, apparatuses, and non-transitory computer-readable medium described herein may further include operations, features, means, or instructions for identifying a number of layers associated with the second downlink transmission and determining a first set of DMRS associated with the number of layers for the second downlink transmission based on the one of the set of DMRS configurations and DMRS in the second downlink transmission. In some examples of the method, apparatuses, and non-transitory computer-readable medium described herein, a second number of layers associated with the first downlink transmission may be different than the number of layers associated with the second downlink transmission.

Some examples of the method, apparatuses, and non-transitory computer-readable medium described herein may further include operations, features, means, or instructions for rating matching the second downlink transmission based on the first set of DMRS.

Some examples of the method, apparatuses, and non-transitory computer-readable medium described herein may further include operations, features, means, or instructions for determining a first frequency resource allocation for the first downlink transmission, determining a second frequency resource allocation for the second downlink transmission, where the second frequency resource allocation may be different than the first frequency resource allocation and identifying a first set of DMRS for the second downlink transmission based on the one of the set of DMRS configurations and frequency resources of the second frequency resource allocation that may be exclusive of the first frequency resource allocation.

Some examples of the method, apparatuses, and non-transitory computer-readable medium described herein may further include operations, features, means, or instructions for transmitting a power ratio indicating a difference between an energy per resource element of a first set of DMRS in the first downlink transmission and an energy per resource element of a second set of DMRS in the second downlink transmission.

In some examples of the method, apparatuses, and non-transitory computer-readable medium described herein, the second downlink transmission includes downlink control information, the identifying the one of the set of DMRS configurations based on the downlink control information.

DETAILED DESCRIPTION

Figure 1:
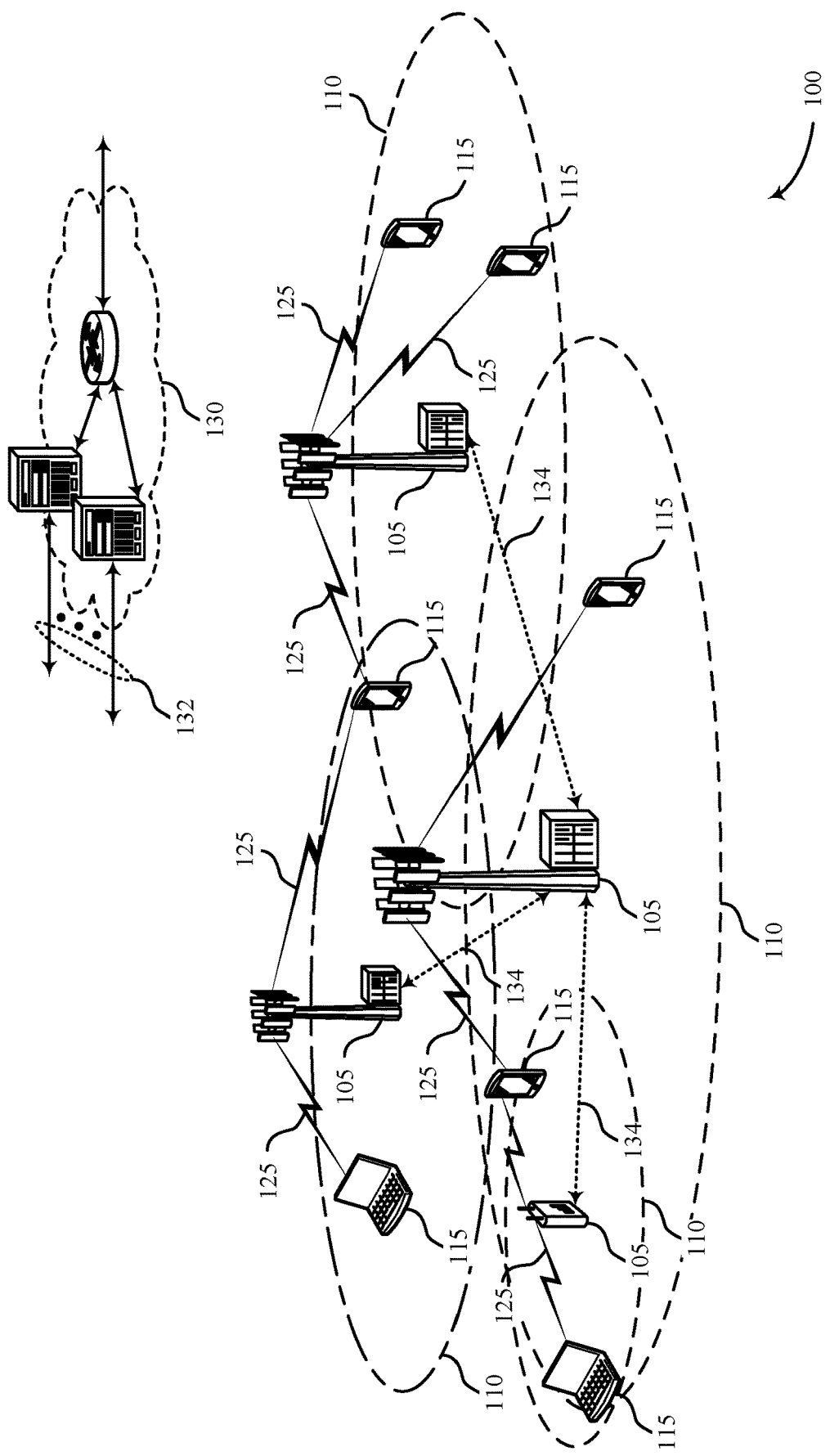
FIG. 1 illustrates an example of a wireless communications system in accordance with aspects of the present disclosure.

As the number of users in a wireless communications system increases, it becomes increasingly important for a base station to support flexible allocation of resources for communications with a user equipment (UE). As such, some wireless communications systems (e.g., New Radio (NR) and/or fifth generation (5G) systems) may support communications between a base station and a UE during a shorter transmission time intervals (TTIs) than some conventional wireless communications systems (e.g., Long Term Evolution (LTE) systems). These shorter TTIs may be referred to as short TTIs or short TTIs (sTTIs). In each sTTI, a base station may transmit control information to a UE in a shortened physical downlink control channel (sPDCCH) and the base station may transmit data to the UE in a shortened physical downlink shared channel (sPDSCH).

In some cases, the base station may also transmit reference signals (e.g., demodulation reference signals (DMRSs)) to the UE in the sTTI to allow the UE to perform channel estimation to correctly demodulate the data in the sPDSCH. In such cases, however, because the duration of the sTTIs used in a wireless communications system may be short, the overhead associated with transmitting these reference signals in each sTTI may be relatively higher, and this relatively higher overhead may be detrimental to the throughput in a wireless communications system. In addition, because a UE may be configured to perform channel estimation to demodulate data in an sTTI using only the reference signals received in that sTTI, the UE may not be able to obtain an accurate and reliable estimate of a data channel in the sTTI. Thus, the UE 115 may not be able to correctly demodulate the data in the sTTI, which may also be detrimental to the throughput in a wireless communications system.

As described herein, a base station may support efficient techniques for transmitting reference signals to a UE with limited overhead. Further, a UE may support efficient techniques for performing channel estimation using reference signals received in multiple sTTIs to improve the accuracy and reliability of a channel estimate used to demodulate data in an sTTI. In some aspects, a base station may transmit reference signals in some of the sTTIs used for downlink communications with a UE and the UE may be configured to use the reference signals in these sTTIs to perform channel estimation for demodulating data received in these sTTIs and others. In addition, using the techniques described herein, the UE may be configured to perform channel estimation for demodulating data received in an sTTI using reference signals received in a variety of combinations of the sTTI and/or previous sTTIs.

Aspects of the disclosure introduced above are described below in the context of a wireless communications system. Examples of processes and signaling exchanges that support downlink DMRS sharing for sTTIs are then described. Aspects of the disclosure are further illustrated by and described with reference to the device diagrams, system diagrams, and flowcharts that relate to downlink DMRS sharing for sTTIs.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a LTE network, an LTE-Advanced (LTE-A) network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Time intervals in LTE or NR may be expressed in multiples of a basic time unit, which may, for example, refer to a sampling period of $T_S=1/30,720,000$ seconds. Time intervals of a communications resource may be organized according to radio frames each having a duration of 10 milliseconds (ms), where the frame period may be expressed as $T_f=307,200\ T_S$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected component carriers using sTTIs).

A base station 105 may communicate with a UE 115 during sTTIs. In each sTTI, the base station 105 may transmit control information to the UE 115 in a sPDCCH, and the base station 105 may transmit data to the UE 115 in a sPDSCH. In some cases, the base station 105 may also transmit reference signals (e.g., DMRSs) to the UE 115 in the sTTI to allow the UE 115 to perform channel estimation to correctly demodulate the control information or data in each sTTI. In such cases, however, because the duration of the sTTIs used in the wireless communications system 100 may be short, the overhead associated with transmitting reference signals in each sTTI may be relatively higher, and this relatively higher overhead may be detrimental to the throughput in the wireless communications system 100. In addition, because a UE 115 may be configured to perform channel estimation to demodulate data in an sTTI using only the reference signals received in that sTTI, the UE 115 may not be able to obtain an accurate and reliable estimate of a data channel in the sTTI. Thus, the UE 115 may not be able to correctly demodulate the data in the sTTI, which may also be detrimental to the throughput in the wireless communications system 100.

As described herein, a base station 105 in the wireless communications system 100 may support efficient techniques for transmitting reference signals to a UE 115 with limited overhead. Further, the UE 115 within the wireless communications system 100 may support efficient techniques for performing channel estimation using reference signals received in multiple sTTIs to relatively improve the accuracy and reliability of a channel estimate used to demodulate data in an sTTI. In some aspects, the base station 105 may transmit reference signals in some of the sTTIs used for downlink communications with the UE 115 and the UE 115 may be configured to use the reference signals in these sTTIs to perform channel estimation for demodulating data or control information in these sTTIs and others. In addition, using the techniques described herein, the UE 115 may be configured to perform channel estimation for demodulating data or control information in an sTTI using reference signals received in the sTTI in combination with reference signals received in previous sTTIs.

Figure 2:
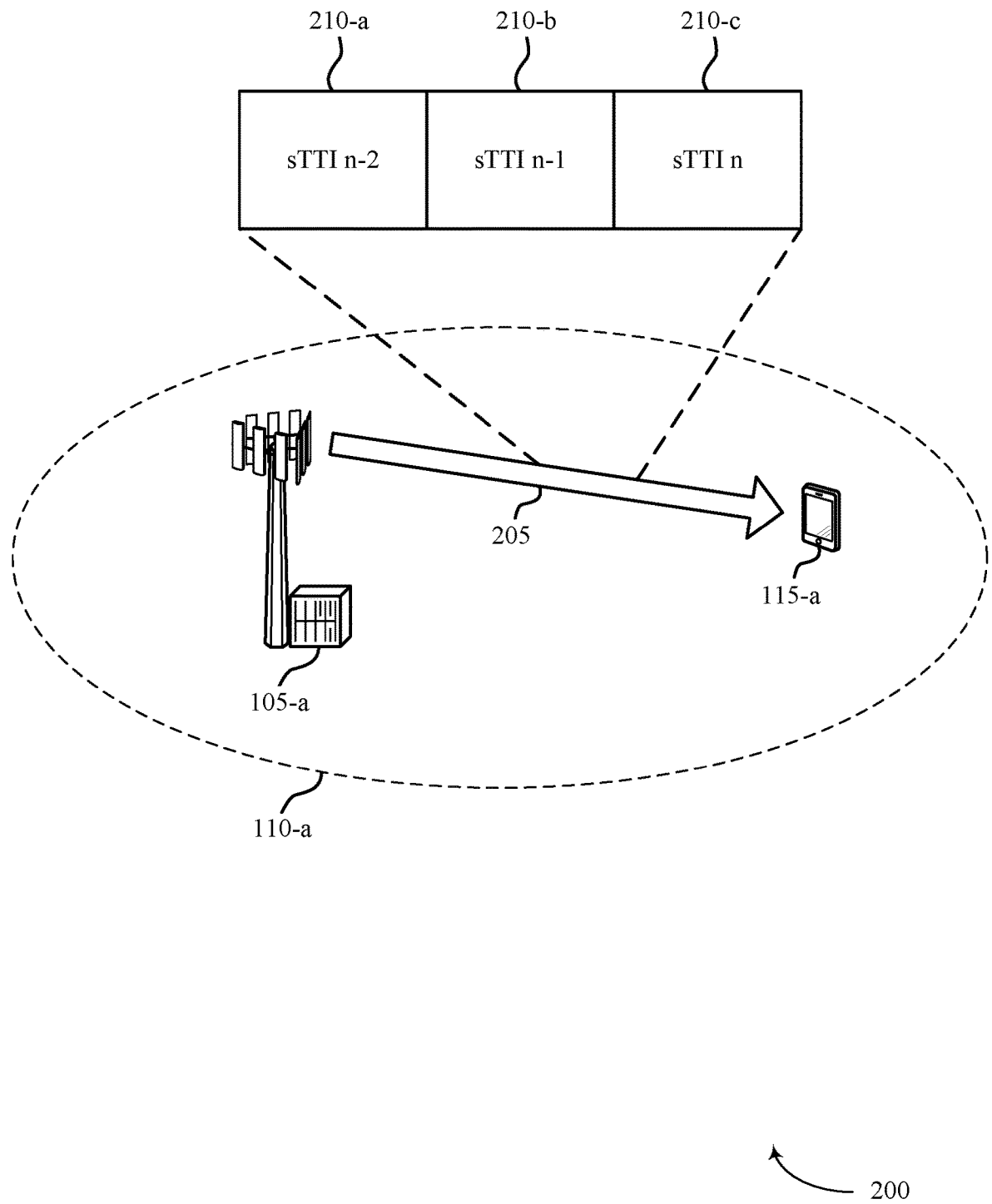
FIG. 2 illustrates an example of a wireless communications system that supports downlink demodulation reference signal (DMRS) sharing for short transmission time intervals (sTTIs) in accordance with aspects of the present disclosure.

FIG. 2 illustrates an example of a wireless communications system 200 that supports downlink DMRS sharing for sTTIs in accordance with aspects of the present disclosure. The wireless communications system 200 includes a base station 105-a and UE 115-a, which may be examples of the corresponding devices described with reference to FIG. 1. The base station 105-a may communicate with UEs 115 (including the UE 115-a) within a geographic coverage area 110-a. For example, the base station 105-a may communicate with the UE 115-a on resources of a carrier 205. The wireless communications system 200 may implement aspects of the wireless communications system 100 as described with reference to FIG. 1. For example, the base station 105-a may communicate with the UE 115-a during one or more sTTIs 210 on resources of the carrier 205 (e.g., during a first sTTI 210-a, a second sTTI 210-b, and/or a third sTTI 210-c).

The base station 105-a may transmit control information to the UE 115-a in an sPDCCH in an sTTI 210 and the base station 105-a may transmit data to the UE 115-a in an sPDSCH in the sTTI 210. In some cases, the base station 105-a may also transmit DMRSs to the UE 115-a in the sTTI 210 to allow UE 115-a to perform channel estimation to demodulate the data or control information in the sTTI 210. Using the techniques described herein, the base station 105-a may transmit the DMRSs in some of the sTTIs 210 used for downlink communications with UE 115-a and UE 115-a may use these DMRSs to perform channel estimation for demodulating data or control information in these sTTIs 210 and other sTTIs 210. For instance, the UE 115-a may buffer the DMRSs (e.g., for one or more antenna ports) received in a first sTTI 210 and, when the UE 115-a fails to receive DMRSs (e.g., associated with one or more antenna ports) in a second sTTI 210 subsequent to the first sTTI 210, the UE 115-a may use the buffered DMRSs to perform channel estimation for demodulating data or control information received in the second sTTI 210. In some cases, this may be referred to sharing the DMRSs received in different transmissions in different sTTIs 210. That is, the UE 115-a may perform channel estimation for a particular sTTI 210 (or for a number of layers in the first sTTI 210) based on DMRSs received, for example, via different antenna ports during a prior sTTI 210. Additionally or alternatively, the UE 115-a may combine DMRSs received using one or more antenna ports in a prior sTTI 210 with DMRS received in a current sTTI 210 using the same one or more antenna ports, where the UE 115-a may use the combined DMRS to perform channel estimation. In some cases, this may be referred to as DMRS combining.

In some cases, the base station 105-a may transmit DMRSs to the UE 115-a with control information transmitted to the UE 115-a in a particular sTTI 210. Additionally or alternatively, the base station 105-a may transmit DMRSs to the UE 115-a in, for example, the assigned frequency time resources of a control resource set (CORESET) but not accompanying control information. In such cases, the UE 115-a may combine DMRSs received in the CORESET in a first sTTI 210 with, for example, DMRSs received in control information of a subsequent sTTI 210.

In some cases, the UE 115-a may be configured to use DMRSs received in a current sTTI, DMRSs received in an sTTI immediately preceding the current sTTI, or both to perform channel estimation for demodulating data or control information received in the current sTTI. That is, the UE 115-a may be configured with a DMRS sharing window size of two. In one example, the UE 115-a may receive DMRSs in sTTI 210-b and the UE 115-a may not receive DMRSs in sTTI 210-c. In this example, the UE 115-a may use the DMRSs received in sTTI 210-b to perform channel estimation to demodulate data or control information received in sTTI 210-c. In another example, the UE 115-a may receive DMRSs in sTTI 210-b and sTTI 210-c (e.g., associated with the same or different antenna ports). In this example, the UE 115-a may perform channel estimation for demodulating data or control information received in sTTI 210-c using the DMRSs received in sTTI 210-c in combination with the DMRSs received in sTTI 210-b.

In other cases, the UE 115-a may be configured to use DMRSs received in a current sTTI 210, DMRSs received in any of the two sTTIs 210 immediately preceding the current sTTI 210, or any combination of the DMRSs received in the current sTTI 210 and the two sTTIs 210 immediately preceding the current sTTI 210 to perform channel estimation to demodulate data or control information received in the current sTTI 210. That is, UE 115-a may be configured with a DMRS sharing window size of three. In one example, UE 115-a may receive DMRSs in sTTI 210-a or sTTI 210-b and the UE 115-a may not receive DMRSs in sTTI 210-c. In this example, the UE 115-a may perform channel estimation using the DMRSs received in sTTI 210-a, or sTTI 210-b, or both to perform channel estimation to demodulate data received in sTTI 210-c. In another example, the UE 115-a may receive DMRSs in sTTI 210-c, sTTI 210-a, sTTI 210-b, or any combination of sTTIs in the sharing window. In this example, the UE 115-a may perform channel estimation to demodulate data received in sTTI 210-c using the DMRSs received in sTTI 210-c in combination with the DMRSs received in sTTI 210-a, sTTI 210-b, or both.

In the wireless communications system 200, the UE 115-a may determine when to use the DMRSs received in a previous sTTI to perform channel estimation to demodulate data received in a current sTTI 210 based on an indicator received in the current sTTI 210 (e.g., in the sPDCCH of the current sTTI 210). Prior to receiving such an indication, the UE 115-a may receive a configuration selection indictor from the base station 105-a that identifies a correspondence between different values of indicators that may be received in the current sTTI 210 and different DMRS configurations. In some cases, the correspondence between a value of an indicator received in a particular sTTI 210 and a DMRS configuration may be based on an index of the sTTI 210 or a number of layers configured for communications in the sTTI 210. That is, the UE 115-a may determine a DMRS configuration that identifies DMRSs for the UE 115-a to use to perform channel estimation to demodulate data received in a particular sTTI 210 based on the value of an indicator received in the sTTI 210, a configuration selection indicator received prior to the sTTI 210, an index of the sTTI 210, and/or a number of layers configured for communications in the sTTI 210.

In one aspect, if the UE 115-a is configured with a DMRS sharing window size of two, the base station 105-a may transmit a one-bit indicator in a current sTTI 210 to indicate whether the UE 115-a should use the DMRSs received in a previous sTTI 210 or a current sTTI 210 to perform channel estimation to demodulate data received in the current sTTI 210. In the example of FIG. 2, if the UE 115-a receives the one-bit indicator "0" in sTTI 210-c, the UE 115-a may determine to perform channel estimation based on the DMRSs received in sTTI 210-c. Alternatively, if the UE 115-a receives the one-bit indicator "1" in sTTI 210-c, the UE 115-a may determine to perform channel estimation based on the DMRSs received in sTTI 210-b. In some examples, the base station 105-b may use an extended indicator (e.g., a two-bit indicator) to indicate that the UE 115-*a* should use a combination of the DMRSs in sTTI 210-*c* and sTTI 210-*b* to perform channel estimation to demodulate data in sTTI 210-*c*.

In another aspect, if the UE 115-*a* is configured with a DMRS sharing window size of three, the base station 105-*a* may transmit a two-bit indicator in the current sTTI 210 to indicate whether the UE 115-*a* should use the DMRSs received in one or more previous sTTIs 210 or a current sTTI 210 to perform channel estimation to demodulate data or control information received in the current sTTI 210. In the example of FIG. 2, if the UE 115-*a* receives the two bit indicator "00" in sTTI 210-*c*, the UE 115-*a* may determine to perform channel estimation based on the DMRSs received in sTTI 210-*c*. If the UE 115-*a* receives the two bit indicator "01" in sTTI 210-*c*, the UE 115-*a* may determine to perform channel estimation based on the DMRSs received in sTTI 210-*b*. If the UE 115-*a* receives the two bit indicator "10" in sTTI 210-*c*, the UE 115-*a* may determine to perform channel estimation based on the DMRSs received in sTTI 210-*a*. In this example, the bit indicator "11" may be reserved. In some examples, the base station 105-*b* may use an extended indicator (e.g., an indicator that is greater than log $2(N_S)$, where $N_S$ is the size of the sharing window) to indicate that the UE 115-*a* should use some combination of the DMRSs in sTTI 210-*a*, sTTI 210-*b*, and sTTI 210-*c* to perform channel estimation to demodulate data in sTTI 210-*c*. In some examples, the extended indicator may have the same number of bits as the sharing window size $N_S$. In this example, the extended indicator may be a three-bit indicator. Each value of the extended indicator may indicate a different combination of the DMRSs in sTTI 210-*a*, sTTI 210-*b*, and sTTI 210-*c* for the UE 115-*a* to use to perform channel estimation (e.g., {sTTI n-2}, {sTTI n-1}, {sTTI n}, {sTTI n, sTTI n-1}, {sTTI n, sTTI n-2}, etc.).

In some cases, however, the overhead associated with the extended indicator may be relatively higher, based on which the base station 105-*a* may be configured to use the non-extended indicator (e.g., a two-bit indicator for $N_S$=3) described above to indicate that the UE 115-*a* should use some combination of the DMRSs in sTTI 210-*a*, sTTI 210-*b*, and sTTI 210-*c* to perform channel estimation to demodulate data in sTTI 210-*c*. In such cases, the reserved two-bit indicator "11" described above may be used to indicate the combination of sTTIs 210 that include DMRSs for the UE 115-*a* to use to perform channel estimation (e.g., {sTTI n, sTTI n-1} or {sTTI n, sTTI n-2}). the base station 105-*a* may transmit signaling (e.g., radio resource control (RRC) signaling) to the UE 115-*a* to indicate the specific combination indicated by the reserved bit indicator "11."

In further aspects, the UE 115-*a* may also account for the sTTI index in determining the sTTIs 210 that include DMRS based on the indicator. For example, DMRS sharing across a subframe may not be supported in some examples, and thus sharing of {sTTI n, sTTI n-2} for sTTI indexes 0 or 1 may not be supported. In such aspects, if the two-bit indicator "11" is configured (e.g., using RRC signaling) to indicate that the UE 115-*a* should use a combination of DMRSs in sTTI 210-*c* and sTTI 210-*a* (e.g., {sTTI n, sTTI n-2}), the UE 115-*a* may apply a rule for DMRS combination sharing for an unsupported combination. In one example, all sTTIs 210 corresponding to unsupported combinations (e.g., sTTIs 210 in previous subframes) are dropped for using DMRS. In another example, the UE 115-*a* uses DMRS in a next subframe that is supported. For example, if sTTI 210-*c* corresponds to sTTI index 1 and the two-bit indicator "11" is received and configured to indicate that the UE 115-*a* should use a combination of DMRSs in sTTI 210-*c* and sTTI 210-*a*, the UE 115-*a* may determine to use the combination of DMRSs in sTTI 210-*c* and sTTI 210-*b* (e.g., {sTTI n, sTTI n-1}) to perform channel estimation for demodulating data in sTTI 210-*c*. That is, the UE 115-*a* may interpret the indicator received from the base station 105-*a* based on an index of an sTTI 210 in which the indicator is received.

Figure 3:
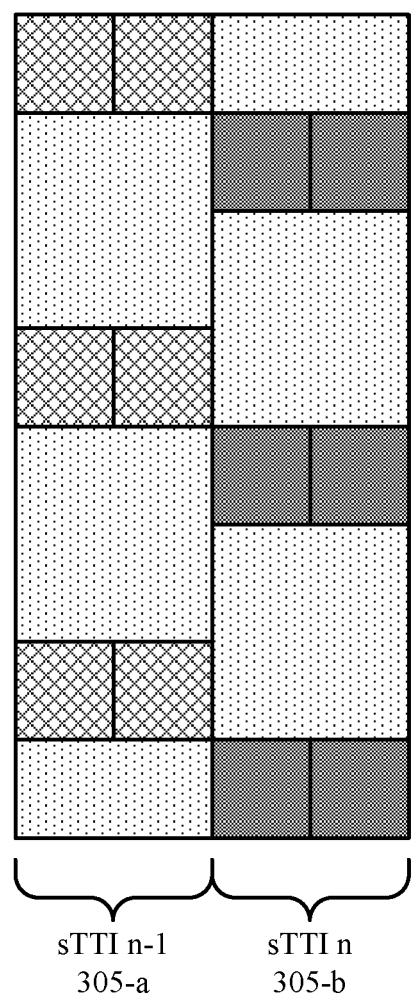
FIGS. 3 through 5 illustrates examples of transmission timelines associated with downlink DMRS sharing for sTTIs in accordance with aspects of the present disclosure.
Figure 4:
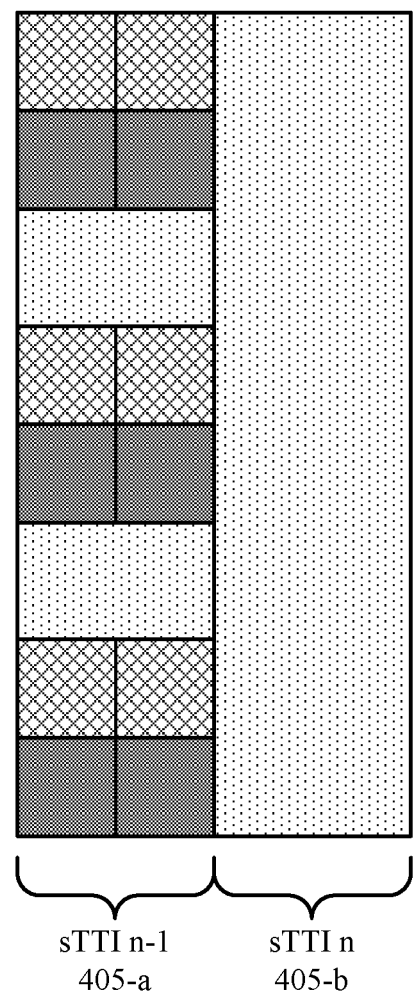
Figure 4:
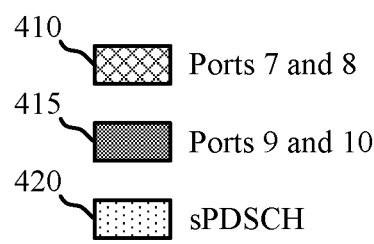
Figure 5:
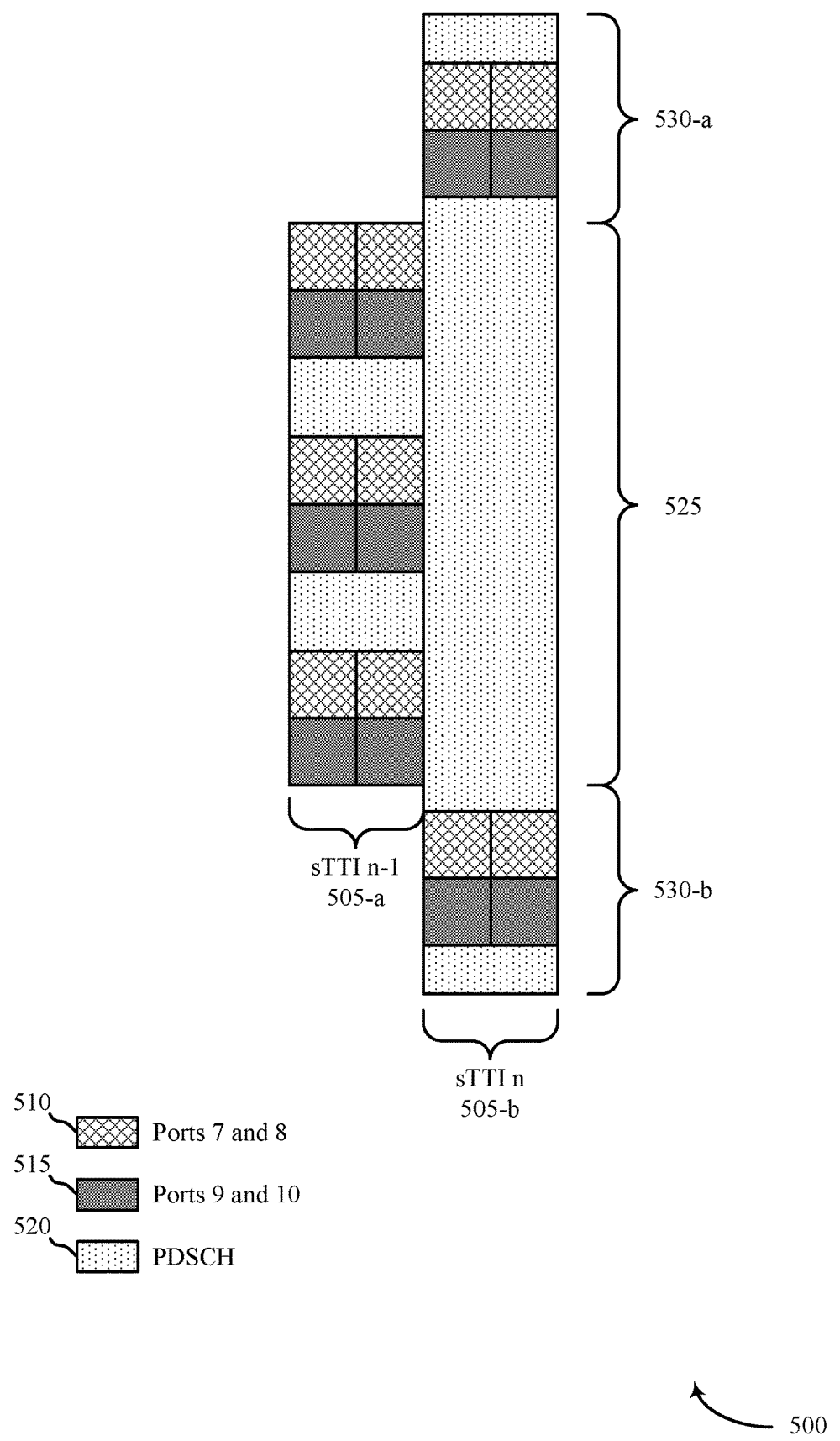

Although the examples described above discuss DMRS sharing window sizes of two and three, it is to be understood that the sharing window sizes may be larger. In some cases, larger DMRS sharing sizes may reduce effective channel estimation due to relatively greater doppler variation between DMRS and sPDSCH. Further, in the examples described above with reference to FIG. 2, the base station 105-*a* may communicate with the UE 115-*a* on a single layer (e.g., a single spatial layer). In some cases, however, the base station 105-*a* may communicate with UE 115-*a* on multiple layers. In particular, the base station 105-*a* may transmit DMRSs and control and data signals to the UE 115-*a* using multiple antenna ports. In such cases, using the techniques described herein, the UE 115-*a* may use the DMRSs transmitted on a set of antenna ports in a previous sTTI to perform channel estimation for demodulating data received in a current sTTI. That is, the UE 115-*a* may use DMRSs received in prior sTTIs 210 to demodulate data received in a current sTTI 210 based on a number of layers used for transmission in the current sTTI 210. For example, if the UE 115-*a* uses four ports to receive a transmission in sTTI 210-*c* using four layers, the UE 115-*a* may determine that the number of layers used for the transmission (i.e., four layers) exceeds a defined threshold number of layers. Based on the number of layers exceeding the defined threshold, the UE 115-*a* may then combine DMRS received in the current sTTI 210-*c* with DMRSs received in the previous sTTIs 210-*a* and/or 210-*b*. FIGS. 3, 4, and 5 illustrate examples of DMRSs transmitted on multiple antenna ports and shared across sTTIs in accordance with aspects of the present disclosure.

FIG. 3 illustrates an example of a transmission timeline 300 associated with downlink DMRS sharing for sTTIs in accordance with aspects of the present disclosure. In some examples, the transmission timeline 300 may be implemented by aspects of the wireless communications system 100 as described with reference to FIG. 1. The transmission timeline 300 illustrates an example of DMRSs transmitted on multiple antenna ports and shared across sTTIs 305 in accordance with aspects of the present disclosure.

In the example of FIG. 3, the base station may be scheduled for a downlink transmission in a sTTI 305-*a* on two layers. Accordingly, the base stations may transmit data, control, and reference signals (e.g., DMRS) to the UE 115 using ports 310 (e.g., ports 7 and 8) in sTTI 305-*a*. In addition, the base station may be scheduled for a downlink transmission in sTTI 305-*b* on four layers. Accordingly, the base station may transmit data and/or control information to the UE using the ports 310 (e.g., ports 7 and 8) and ports 315 (e.g., ports 9 and 10) in sTTI 305-*b*. As described herein, in order to reduce the overhead associated with reference signal transmissions for downlink transmissions exceeding a threshold number of layers (e.g., one layer, two layers), the base station may transmit the reference signals (e.g., DMRS) in sTTI 305-*b* using the ports 315 (e.g., ports 9 and 10) rather than using all four ports. The UE may, based on the number of ports in sTTI 305-*b* (e.g., the number of ports in sTTI 305-*b* being greater than the threshold number of ports), use the reference signals received on the ports 310 in sTTI 305-*a* and the reference signals received on the ports 315 in sTTI 305-b to perform channel estimation to demodulate data or control information received in sTTI 305-b.

In some cases, the base station may transmit an indication to the UE to configure the UE to use the reference signals transmitted during a previous sTTI 305 to perform channel estimation for demodulating data received in a current sTTI. In the example of FIG. 3, the base station may transmit an indication in sTTI 305-b that reference signals associated with the ports 310 (e.g., ports 7 and 8) are transmitted in sTTI 305-a. Accordingly, the UE may receive the indication and determine to perform channel estimation to demodulate data received in sTTI 305-b using the reference signals associated with the ports 310 received in sTTI 305-a and the reference signals associated with ports 315 received in sTTI 305-b. In other examples, the base station may transmit an indication in sTTI 305-b that reference signals associated with the ports 310 are transmitted in another sTTI 305 (e.g., sTTI n-2). Accordingly, the UE may receive the indication and determine to perform channel estimation for demodulating data received in sTTI 305-b using the reference signals associated with the ports 310 received in the other sTTI 305 and the reference signals associated with the ports 315 received in sTTI 305-b.

In some aspects, the base station may also transmit the reference signals associated with the ports 310 in sTTI 305-b (not shown). In such aspects, the base station may configure the UE to perform channel estimation using the reference signals associated with the ports 310 received in sTTI 305-b in combination with the reference signals associated with the ports 310 received in sTTI 305-a. The base station may configure the UE to perform channel estimation using the reference signals received in sTTI 305-a and the sTTI 305-b using an indication transmitted in sTTI 305-b. Once the UE determines the reference signals to use for channel estimation, the UE may perform channel estimation to obtain an estimate of an sPDSCH 320 in a particular sTTI 305. The UE may then use this channel estimate to demodulate the sPDSCH 320 in the sTTI 305. In some cases, the sPDSCH 320 may be rate matched around the reference signals that are present in an sTTI 305. In the example of FIG. 3, sTTI 305-b may include reference signals associated with two antenna ports 315 (e.g., ports 9 and 10). Thus, the sPDSCH 320 may be rate matched around the reference signals associated with these two antenna ports. The UE may receive the data, control, and reference signals in sTTI 305-b and identify that the reference signals in sTTI 305-b are associated with the two antenna ports 315 (e.g., based on an indication in sTTI 305-b). Accordingly, the UE may de-rate match the sPDSCH 320 in sTTI 305-b based on the reference signals received in sTTI 305-b.

In addition to performing channel estimation based on the reference signals in an sTTI 305 and receiving data in the sTTI 305 based on the channel estimation, the UE may monitor and receive data in the sTTI 305 based on an energy per resource element (EPRE) ratio between sPDSCH 320 and DMRSs in the sTTI 305. As described herein, the ratio of the sPDSCH EPRE to the DMRS EPRE in the sTTI 305 may be based on a number of layers configured for communications in the sTTI 305. Thus, the ratio of the sPDSCH EPRE to the DMRS EPRE in the sTTI 305 may not be based on a number of layers used to transmit reference signals in a previous sTTI 305 (which, as described herein, may be greater than or less than a number of layers configured for communications in the sTTI 305). Accordingly, in sTTI 305-b in the example of FIG. 3, the ratio of the sPDSCH EPRE to the DMRS EPRE may be given by a configured ratio for sPDSCH EPRE to the DMRS EPRE associated with four layers. In some examples, the configured ratio for four layers may be approximately one half (e.g., −3 dB). The ratio may be preconfigured or may be configured via control signaling (e.g., RRC signaling).

In some examples (e.g., for low latency applications), multiple base stations may coordinate their transmit power such that one base station may increase its transmit power during an sTTI 305 while another base station may reduce its transmit power during the same sTTI 305 (e.g., to manage interference). In such examples, the transmit power used by the base stations 105 may be different over an entire system bandwidth or over some sub-bands of the system bandwidth. In addition, the transmit power used by the base station may be different across sTTIs 305. In such cases, it may be appropriate for the UE to monitor an sTTI 305 based on the transmit power used by the base station to transmit signals in that sTTI 305. As described herein, a base station may transmit and a UE may receive an indication of a power ratio indicating a difference between a DMRS EPRE in a first sTTI 305 and a DMRS EPRE in a second sTTI 305. Accordingly, the UE may receive the power ratio and determine an appropriate configuration for monitoring and receiving DMRSs and data in the sTTI 305.

FIG. 4 illustrates an example of a transmission timeline 400 associated with downlink DMRS sharing for sTTIs in accordance with aspects of the present disclosure. In some examples, the transmission timeline 400 may implement aspects of the wireless communications system 100 as described with reference to FIG. 1. The transmission timeline 400 illustrates an example of DMRSs transmitted on multiple antenna ports and shared across sTTIs 405 in accordance with aspects of the present disclosure.

In the example of FIG. 4, a base station may be scheduled for a downlink transmission in a sTTI 405-a on four layers. Accordingly, the base station may transmit data, control, and reference signals (e.g., DMRS) to a UE using ports 410 (e.g., ports 7 and 8) and ports 415 (e.g., ports 9 and 10) in sTTI 405-a. In addition, the base station may be scheduled for a downlink transmission in sTTI 405-b on two layers. Accordingly, the base station may transmit sPDSCH 420 to the UE using layers corresponding to the ports 410 (e.g., ports 7 and 8) in the sTTI 405. As described herein, to reduce the overhead associated with reference signal transmissions, the base station may avoid transmitting reference signals (e.g., DMRS) on the ports 410 in sTTI 405-b. The UE may thus use the reference signals received on the ports 410 in sTTI 405-a to perform channel estimation to demodulate data received in sTTI 405-b.

In some cases, the base station may transmit an indication to the UE to configure the UE to use the reference signals transmitted during a previous sTTI 405 to perform channel estimation for demodulating data received in a current sTTI 405. In the example of FIG. 4, the base station may transmit an indication in the sTTI that reference signals associated with the ports 410 (e.g., ports 7 and 8) are transmitted in sTTI 405-a. Accordingly, the UE may receive the indication and determine to perform channel estimation to demodulate data received in sTTI 405-b using the reference signals associated with the ports 410 received in sTTI 405-a. In other examples, the base station may transmit an indication in sTTI 405-b that reference signals associated with the ports 410 are transmitted in another sTTI 405 (e.g., sTTI n-2). Accordingly, the UE may receive the indication and determine to perform channel estimation for demodulating data received in sTTI 405-b using the reference signals associated with the ports 410 received in the other sTTI 405.

In some aspects, the base station may additionally or alternatively transmit the reference signals associated with the ports 410 in sTTI 405-*b* (not shown). In such aspects, the base station may configure the UE to perform channel estimation using the reference signals associated with the ports 410 received in sTTI 405-*b* in combination with the reference signals associated with the ports 410 received in sTTI 405-*a*. The base station may configure the UE to perform channel estimation using the reference signals received in sTTI 405-*a* and sTTI 405-*b* using an indication transmitted in sTTI 405-*b*.

Once the UE determines the reference signals to use for channel estimation, the UE may perform channel estimation to obtain an estimate of the sPDSCH 420 in an sTTI 405. The UE may then use this channel estimate to demodulate the sPDSCH 420 in the sTTI 405. In some cases, the sPDSCH 420 may be rate matched around the reference signals that are present in a corresponding sTTI 405. In the example of FIG. 4, sTTI 405-*b* may not include any DMRS. Thus, the sPDSCH 420 may be transmitted on all resource elements in sTTI 405-*b* (or a subset if some elements are otherwise allocated to different signals or channels). The UE may receive the data and control signals in sTTI 405-*b* and identify that there are no DMRS in sTTI 405-*b*. Accordingly, the UE may receive the sPDSCH in sTTI 405-*b* on all the resource elements in sTTI 405-*b*.

In addition to performing channel estimation based on the DMRSs in an sTTI 405 and receiving data in the sTTI 405 based on the channel estimation, the UE may monitor and receive data in the sTTI 405 based on an EPRE ratio between the sPDSCH and DMRSs in the sTTI 405. As described herein, the ratio of the sPDSCH EPRE to the DMRS EPRE in the sTTI 405 may be based on a number of layers configured for communications in the sTTI 405. Thus, the ratio of the sPDSCH EPRE to the DMRS EPRE in the sTTI 405 may not be based on a number of layers used to transmit reference signals in the sTTI 405 (which, as described herein, may be less than a number of layers configured for communications in the sTTI 405). Accordingly, in sTTI 405-*b* in the example of FIG. 4, the ratio of the sPDSCH EPRE to the DMRS EPRE (e.g., the EPRE used to transmit reference signals on the ports 410 in sTTI 405-*a*) may be a ratio of sPDSCH EPRE to the DMRS EPRE configured for two layers. In some examples, the sPDSCH EPRE to the DMRS EPRE ratio for two layers may be one (e.g., 0 dB). The ratio of sPDSCH EPRE to the DMRS EPRE may be preconfigured for the given number of layers, or may be received in control signaling (e.g., RRC signaling).

In some examples (e.g., for low latency applications), multiple base stations may coordinate their transmit power such that one base station may increase its transmit power during an sTTI 405 while another base station may reduce its transmit power during the sTTI 405 (e.g., to manage interference). In such examples, the transmit power used by the base stations may be different over an entire system bandwidth or over some sub-bands of the system bandwidth. In addition, the transmit power used by the base station may be different across sTTIs 405. In such cases, it may be appropriate for a UE to monitor an sTTI 405 based on the transmit power used by the base station to transmit signals in that sTTI 405. As described herein, the base station may transmit and the UE may receive an indication of a power ratio indicating a difference between a DMRS EPRE in a first sTTI 405 and a DMRS EPRE in a second sTTI 405 (e.g., a power ratio). Accordingly, the UE may receive the power ratio and determine an appropriate configuration for monitoring and receiving DMRSs and data in an sTTI 405.

In some aspects of the techniques described with reference to FIGS. 4 and 5, a base station may determine whether to transmit DMRSs to a UE in an sTTI based on the DMRSs transmitted to the UE in previous sTTIs in a DMRS sharing window. For example, the base station may avoid transmitting DMRSs on the same ports to the UE in multiple sTTIs in a DMRS sharing window. In other aspects, however, the base station may transmit DMRSs on the same ports to the UE in multiple sTTIs in a DMRS sharing window to allow the UE to perform channel estimation based on the combination of DMRSs in different sTTIs. In such aspects, the overhead associated with DMRS transmissions may be relatively increased. As described herein, to limit the overhead associated with DMRS transmissions in these aspects, the base station may determine which sTTIs to use to transmit DMRSs to the UE based on certain predefined rules.

In one example, a base station may determine a number of sTTIs in which to transmit DMRSs to a UE in a DMRS sharing window based on a number of layers used for communications in the sTTIs 405 (e.g., in all sTTIs 405) in the DMRS sharing window. In some cases, if the number of layers used for communications in sTTIs 405 in a DMRS sharing window is above a layer threshold (e.g., two), the number of sTTIs 405 in the DMRS sharing window used to transmit DMRSs may be limited by a DMRS threshold (e.g., one). Alternatively, regardless of the number of layers used for communications in sTTIs 405 in a DMRS sharing window, the number of sTTIs 405 in the DMRS sharing window used to transmit DMRSs may be limited by a DMRS threshold (e.g., one). In another example, the base station may avoid transmitting DMRSs associated with the same ports in adjacent sTTIs 405. For example, for a given number of configured DMRS ports (e.g., number of layers), a UE may assume that DMRS are present in a current sTTI corresponding to those ports not present in the previous sTTI.

Although the base station may not transmit DMRSs associated with a set of ports in all sTTIs 405, the base station may transmit the indicator of the DMRS configuration used for channel estimation in all sTTIs 405. In some cases, if an indicator received in a current sTTI 405 (e.g., a current indicator) indicates a DMRS configuration that is not consistent with a DMRS configuration indicated by an indicator received in a previous sTTI 405 (e.g., a previous indicator), the UE may be configured to ignore one of the indicators (e.g., the indicator received in the current sTTI 405). For example, if a previous indicator indicates that DMRSs are transmitted on a set of ports in sTTI n-2, a current indicator indicates that DMRSs are transmitted on the same set of ports in sTTI n-1, and the base station may be configured to avoid transmitting DMRSs on a same set of ports in adjacent sTTIs 405, the UE may determine that the DMRS configurations indicated by the indicators are inconsistent. Accordingly, the UE may ignore either the previous indicator or the current indicator. In other cases, if the UE receives multiple indicators indicating inconsistent DMRS configurations, the UE may identify a DMRS configuration that is consistent with the majority of the indicators.

FIG. 5 illustrates an example of a transmission timeline 500 associated with downlink DMRS sharing for sTTIs in accordance with aspects of the present disclosure. In some examples, the transmission timeline 500 may implement aspects of the wireless communications system 100 as described with reference to FIG. 1. The transmission timeline 500 illustrates an example of DMRSs transmitted on multiple antenna ports and shared across sTTIs 505 in accordance with aspects of the present disclosure.

In the example of FIG. 5, a base station may be scheduled for downlink transmissions in a sTTI 505-*a* and a sTTI 505-*b* on four layers. Thus, the base station may transmit control, data, and reference signals to a UE in sTTI 505-*a* and sTTI 505-*b* using ports 510 (e.g., ports 7 and 8) and ports 515 (e.g., ports 9 and 10). In some cases, the reliability associated with the transmission of control information (e.g., in a sPDCCH) in sTTIs 505 may be high. In such cases, DMRSs transmitted in a portion of a system bandwidth may be shared across sTTIs 505. For example, the base station may transmit an indication in sTTI 505-*a* of the portion of a system bandwidth 525 that includes DMRSs for the UE. Then, in the subsequent sTTI 505-*b*, the base station may transmit DMRSs on the portions of the system bandwidth 530 not overlapping with the portion of the system bandwidth 525 that includes DMRSs in sTTI 505-*a* (e.g., the portions of the system bandwidth 530-*a* and 530-*b*). Thus, the UE may receive the indication that sTTI 505-*a* includes DMRSs for the UE and the UE may determine to perform channel estimation to demodulate the sPDSCH 520 in sTTI 505-*b* using the DMRSs in sTTI 505-*a* for portions of the sPDSCH in sTTI 505-*a* overlapping with the sPDSCH in sTTI 505-*b* and the DMRSs in sTTI 505-*b* for the portions of the sPDSCH in sTTI 505-*b* not overlapping with the sPDSCH in sTTI 505-*a*.

Figure 6:
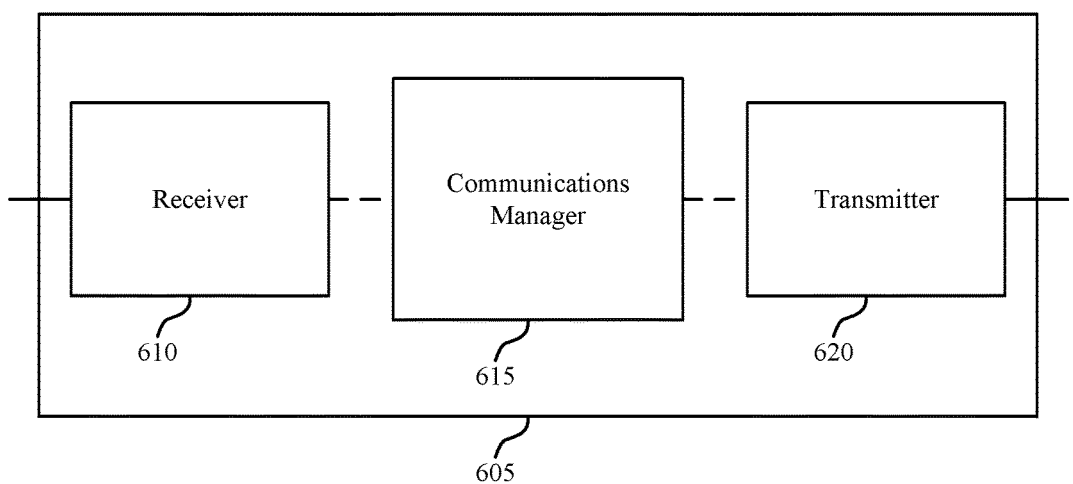
FIGS. 6 and 7 shows a block diagram of a device that supports downlink DMRS sharing for sTTIs in accordance with aspects of the present disclosure.

FIG. 6 shows a block diagram 600 of a device 605 that supports downlink DMRS sharing for sTTIs in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to downlink demodulation reference signal sharing for short transmission time intervals, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a first downlink transmission in a first sTTI, receive a second downlink transmission in a second sTTI, identify one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission, and demodulate the second downlink transmission based on the one of the set of DMRS configurations. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
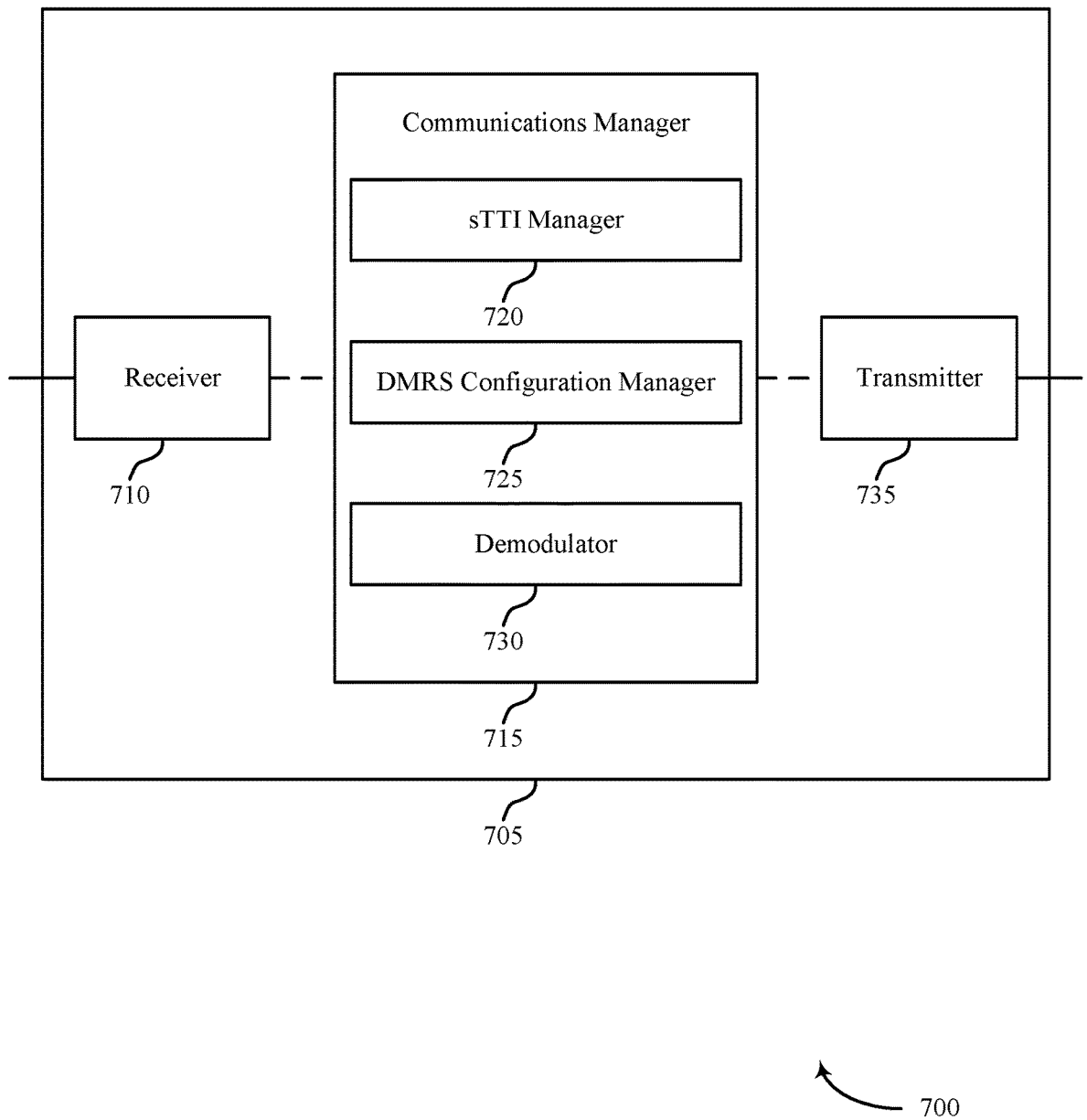

FIG. 7 shows a block diagram 700 of a device 705 that supports downlink DMRS sharing for sTTIs in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to downlink demodulation reference signal sharing for short transmission time intervals, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an sTTI manager 720, a DMRS configuration manager 725, and a demodulator 730. The communications manager 715 may be an example of aspects of the communications manager 910 described herein.

The sTTI manager 720 may receive a first downlink transmission in a first sTTI and receive a second downlink transmission in a second sTTI.

The DMRS configuration manager 725 may identify one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission.

The demodulator 730 may demodulate the second downlink transmission based on the one of the set of DMRS configurations.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
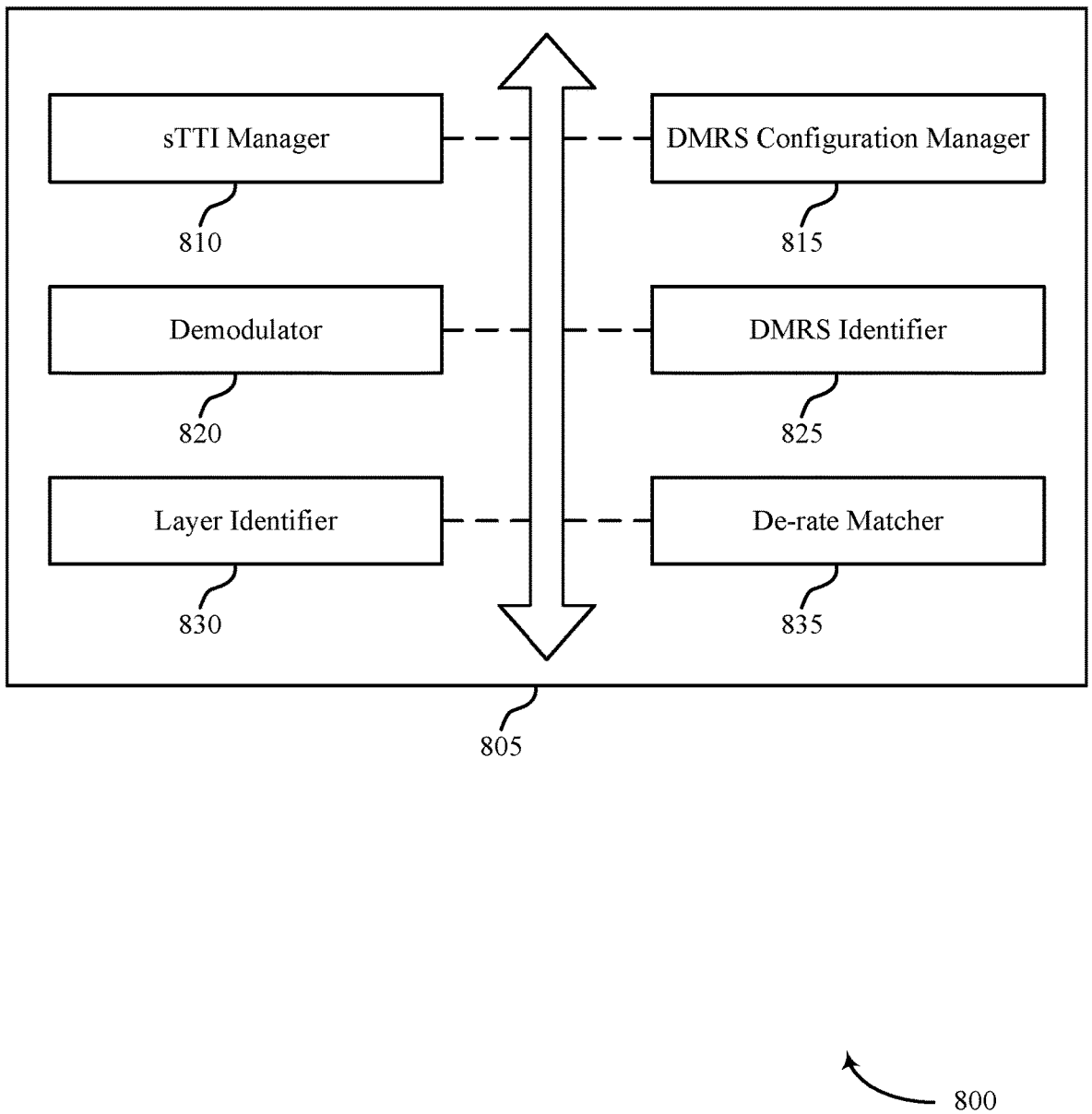
FIG. 8 shows a block diagram of a communications manager that supports downlink DMRS sharing for sTTIs in accordance with aspects of the present disclosure.

FIG. 8 shows a block diagram 800 of a communications manager 805 that supports downlink DMRS sharing for sTTIs in accordance with aspects of the present disclosure. The communications manager 805 may be an example of aspects of a communications manager 615, a communications manager 715, or a communications manager 910 described herein. The communications manager 805 may include an sTTI manager 810, a DMRS configuration manager 815, a demodulator 820, a DMRS identifier 825, a layer identifier 830, and a de-rate matcher 835. Each of these modules may communicate, directly or indirectly, with one another (e.g., via one or more buses).

The sTTI manager 810 may receive a first downlink transmission in a first sTTI. In some examples, the sTTI manager 810 may receive a second downlink transmission in a second sTTI.

The DMRS configuration manager 815 may identify one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission. In some examples, the DMRS configuration manager 815 may receive control information in the second downlink transmission comprising an indicator of the one of the plurality of DMRS configurations. In some examples, the DMRS configuration manager 815 may receive, prior to receiving the second downlink transmission, a configuration selection indicator indicating a correspondence between a value for an indicator of the one of the plurality of DMRS configurations and a first combined DMRS configuration.

In some examples, the DMRS configuration manager 815 may apply a second combined DMRS configuration based on an sTTI index associated with the second downlink transmission, the second combined DMRS configuration corresponding to a presence of DMRS in the second downlink transmission and a third downlink transmission corresponding to a third prior sTTI. In some cases, the identifying the one of the set of DMRS configurations includes identifying the at least one combined DMRS configuration based on a number of layers used for the second downlink transmission being above a layer threshold. In some cases, the correspondence between the value of the indicator and the first combined DMRS configuration is based on an sTTI index associated with the first downlink transmission. In some cases, the correspondence between the value of the indicator and the first combined DMRS configuration is based on a number of layers associated with the second downlink transmission. In some cases, the second downlink transmission includes downlink control information, the identifying the one of the set of DMRS configurations based on the downlink control information.

The demodulator 820 may demodulate the second downlink transmission based on the one of the set of DMRS configurations. In some examples, the demodulator 820 may perform channel estimation for the number of layers associated with the second downlink transmission based on an energy per resource element power ratio between the first set of DMRS and data resource elements of the second downlink transmission that correspond to the number of layers associated with the second downlink transmission. In some examples, the demodulator 820 may receive a power ratio indicating a difference between an energy per resource element of a first set of DMRS in the first downlink transmission and an energy per resource element of a second set of DMRS in the second downlink transmission. In some cases, the energy per resource element ratio is one.

The DMRS identifier 825 may determine a first set of DMRS associated with each of the number of layers for the second downlink transmission based on the one of the set of DMRS configurations and DMRS in the second downlink transmission. In some examples, the DMRS identifier 825 may determine a first frequency resource allocation for the first downlink transmission. In some examples, the DMRS identifier 825 may determine a second frequency resource allocation for the second downlink transmission, where the second frequency resource allocation is different than the first frequency resource allocation. In some examples, the DMRS identifier 825 may identify a first set of DMRS in the second downlink transmission based on the one of the set of DMRS configurations and frequency resources of the second frequency resource allocation that are exclusive of the first frequency resource allocation.

In some cases, the first sTTI and the second sTTI make up a DMRS sharing window. In some cases, a number of layers used for the second downlink transmission is above a layer threshold, and where a number of downlink transmissions in the DMRS sharing window including DMRS is below a DMRS threshold. In some cases, a number of downlink transmissions in the DMRS sharing window including DMRS is below a DMRS threshold. In some cases, the first downlink transmission and the second downlink transmission are received in adjacent sTTIs including DMRS.

The layer identifier 830 may identify a number of layers associated with the second downlink transmission.

The de-rate matcher 835 may de-rate matching the second downlink transmission based on the first set of DMRS.

Figure 9:
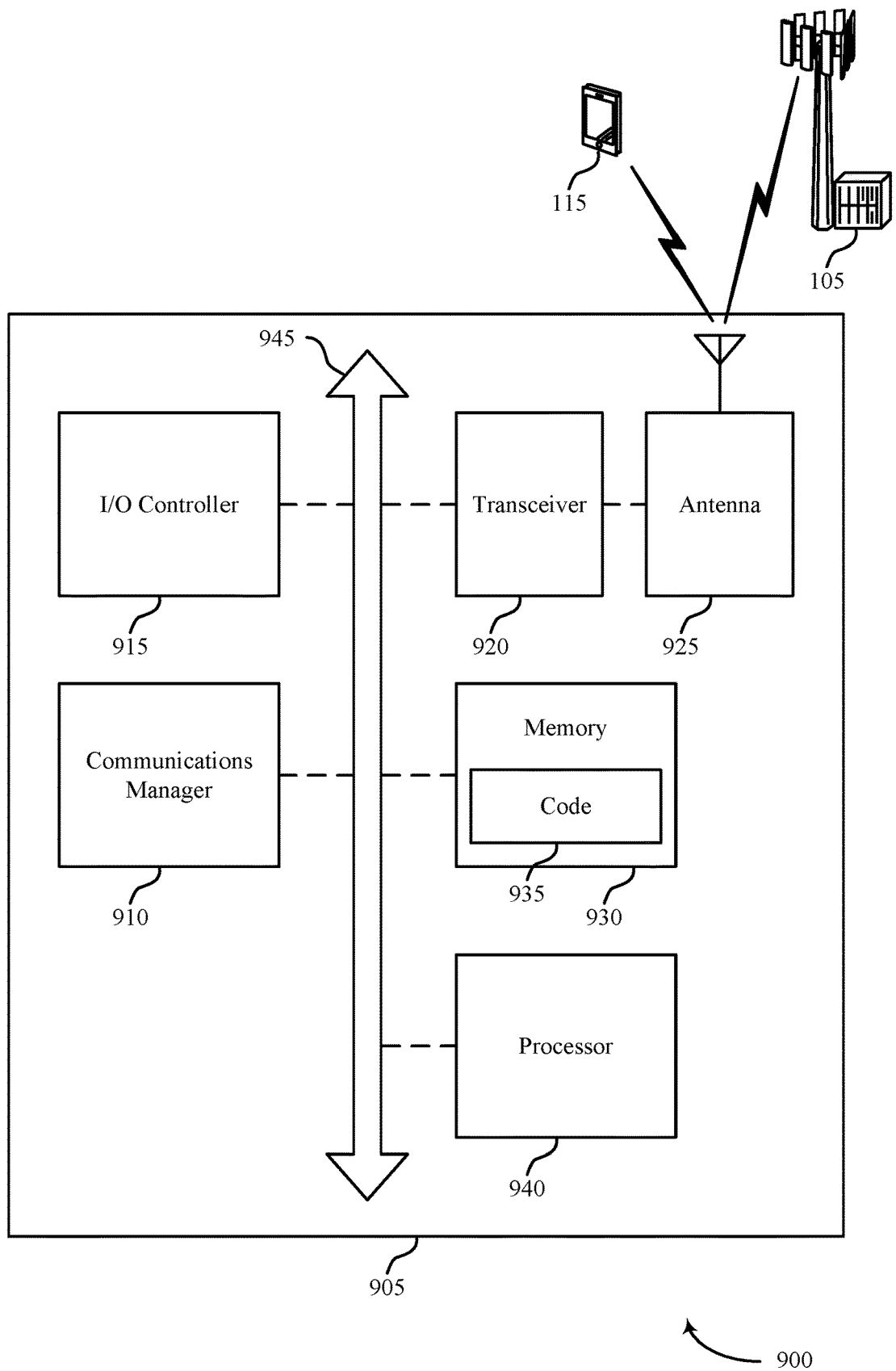
FIG. 9 shows a diagram of a system including a device that supports downlink DMRS sharing for sTTIs in accordance with aspects of the present disclosure.

FIG. 9 shows a diagram of a system 900 including a device 905 that supports downlink DMRS sharing for sTTIs in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a first downlink transmission in a first sTTI, receive a second downlink transmission in a second sTTI, identify one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission, and demodulate the second downlink transmission based on the one of the set of DMRS configurations.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a Basic Input/Output System (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting downlink demodulation reference signal sharing for short transmission time intervals).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
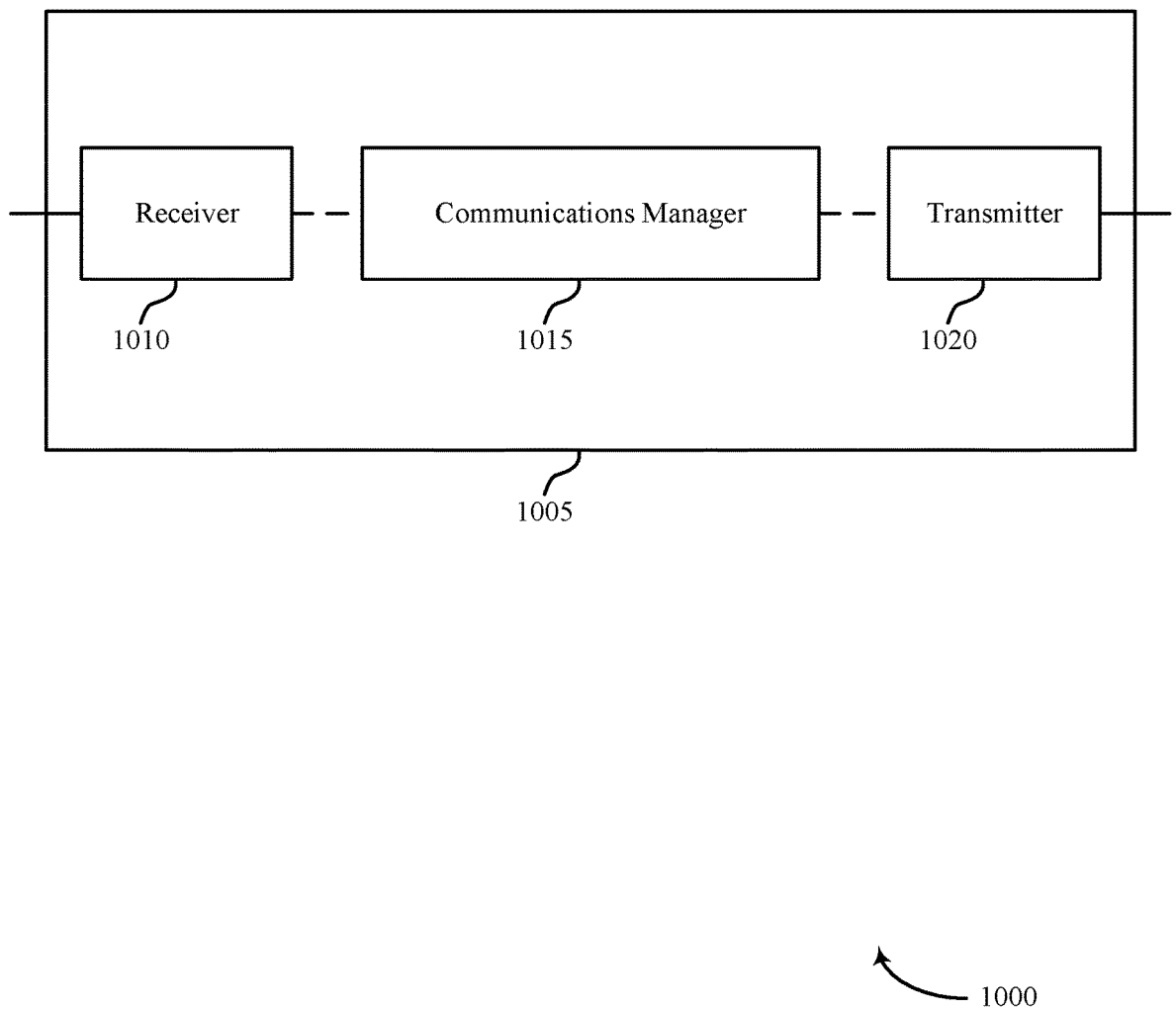
FIGS. 10 and 11 show block diagrams of devices that support downlink DMRS sharing for sTTIs in accordance with aspects of the present disclosure.

FIG. 10 shows a block diagram 1000 of a device 1005 that supports downlink DMRS sharing for sTTIs in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to downlink demodulation reference signal sharing for short transmission time intervals, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a first downlink transmission in a first sTTI, transmit the second downlink transmission in the second sTTI, and determine a DMRS configuration for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
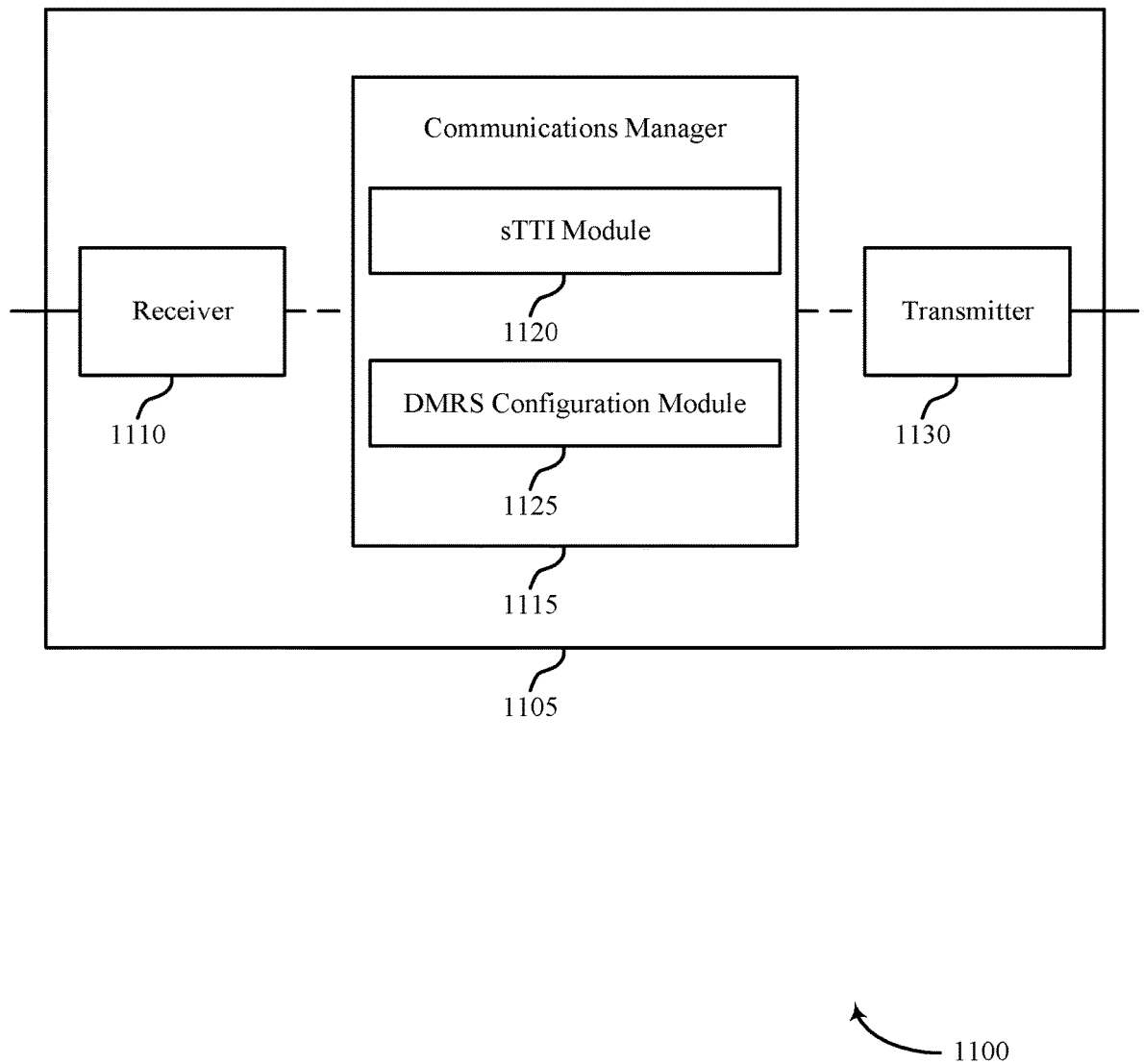

FIG. 11 shows a block diagram 1100 of a device 1105 that supports downlink DMRS sharing for sTTIs in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to downlink demodulation reference signal sharing for short transmission time intervals, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an sTTI module 1120 and a DMRS configuration module 1125. The communications manager 1115 may be an example of aspects of the communications manager 1310 described herein.

The sTTI module 1120 may transmit a first downlink transmission to a UE in a first sTTI and transmit the second downlink transmission in the second sTTI.

The DMRS configuration module 1125 may determine a DMRS configuration for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission. In some examples, the DMRS configuration module 1125 may transmit control information to the UE in the second downlink transmission comprising an indicator of the one of the plurality of DMRS configurations.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
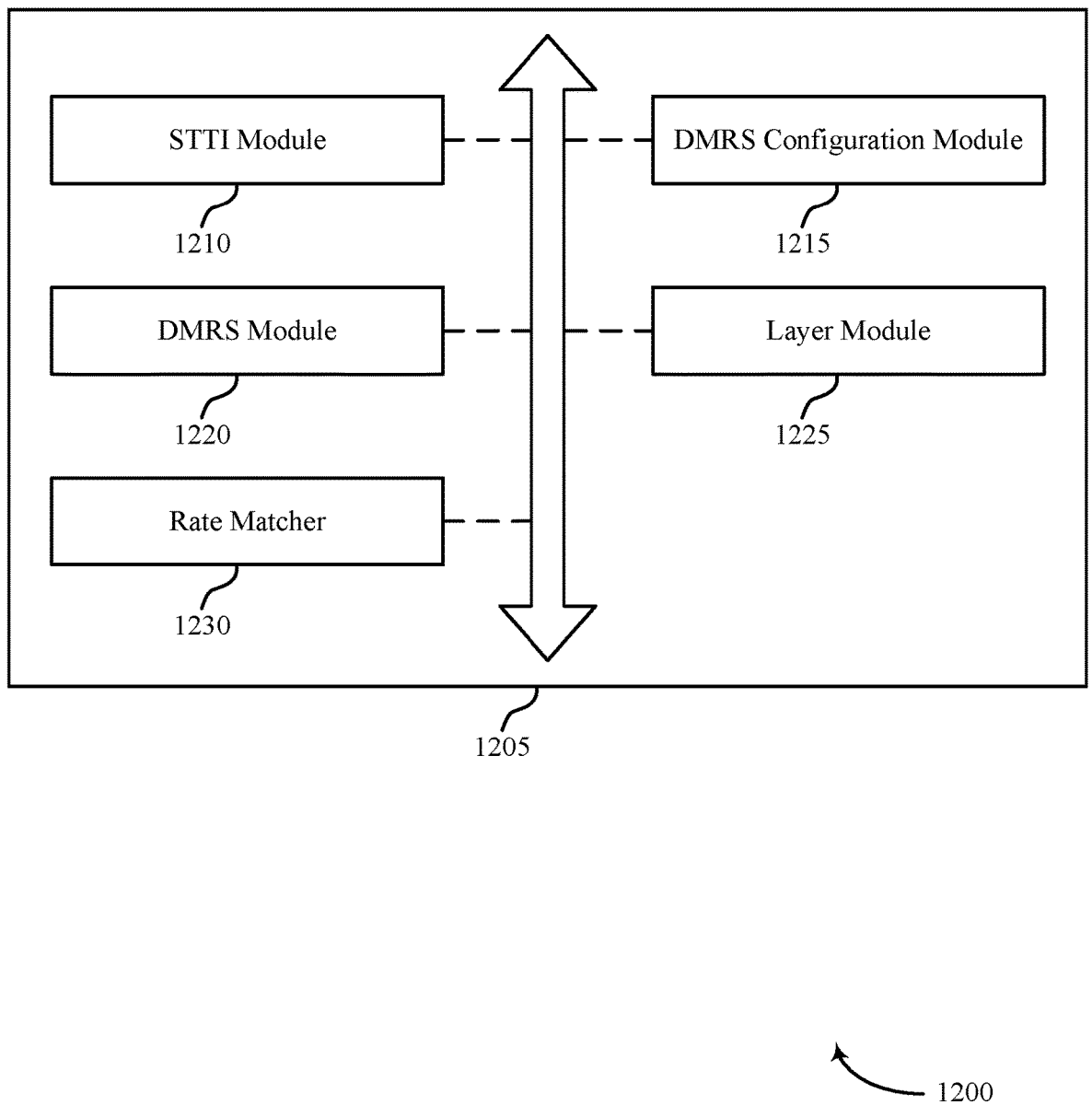
FIG. 12 shows a block diagram of a communications manager that supports downlink DMRS sharing for sTTIs in accordance with aspects of the present disclosure.

FIG. 12 shows a block diagram 1200 of a communications manager 1205 that supports downlink DMRS sharing for sTTIs in accordance with aspects of the present disclosure. The communications manager 1205 may be an example of aspects of a communications manager 1015, a communications manager 1115, or a communications manager 1310 described herein. The communications manager 1205 may include an sTTI module 1210, a DMRS configuration module 1215, a DMRS module 1220, a layer module 1225, and a rate matcher 1230. Each of these modules may communicate, directly or indirectly, with one another (e.g., via one or more buses).

The sTTI module 1210 may transmit a first downlink transmission in a first sTTI. In some examples, the sTTI module 1210 may transmit the second downlink transmission in the second sTTI.

The DMRS configuration module 1215 may determine a DMRS configuration for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission. In some examples, determining the DMRS configuration includes selecting the at least one combined DMRS configuration based on a number of layers used for the second downlink transmission being above a layer threshold.

In some examples, the DMRS configuration module 1215 may transmit, prior to transmitting the first downlink transmissions and the second downlink transmissions, a configuration selection indicator indicating a correspondence between a value for an indicator of the one of the plurality of DMRS configurations and a first combined DMRS configuration. In some examples, the DMRS configuration module 1215 may determine a second combined DMRS configuration based on an sTTI index associated with the second downlink transmission, the second combined DMRS configuration corresponding to a presence of DMRS in the second downlink transmission and a third downlink transmission corresponding to a third prior sTTI. In some cases, the correspondence between the value of the indicator and the first combined DMRS configuration is based on an sTTI index associated with the first downlink transmission. In some cases, the correspondence between the value of the indicator and the first combined DMRS configuration is based on a number of layers associated with the second downlink transmission. In some cases, the second downlink transmission includes downlink control information, the identifying the one of the set of DMRS configurations based on the downlink control information.

The DMRS module 1220 may determine a first set of DMRS associated with each of the number of layers for the first downlink transmission based on the one of the set of DMRS configurations and DMRS in the second downlink transmission. In some examples, the DMRS module 1220 may determine a first frequency resource allocation for the first downlink transmission. In some examples, the DMRS module 1220 may determine a second frequency resource allocation for the second downlink transmission, where the second frequency resource allocation is different than the first frequency resource allocation. In some examples, the DMRS module 1220 may identify a first set of DMRS for the second downlink transmission based on the one of the set of DMRS configurations and frequency resources of the second frequency resource allocation that are exclusive of the first frequency resource allocation. In some examples, the DMRS module 1220 may transmit a power ratio indicating a difference between an energy per resource element of a first set of DMRS in the first downlink transmission and an energy per resource element of a second set of DMRS in the second downlink transmission.

In some cases, the first sTTI and the second sTTI make up a DMRS sharing window. In some cases, a number of layers used for the second downlink transmission is above a layer threshold, and where a number of downlink transmissions in the DMRS sharing window including DMRS is below a DMRS threshold. In some cases, a number of downlink transmissions in the DMRS sharing window including DMRS is below a DMRS threshold. In some cases, one of two downlink transmissions in adjacent sTTIs includes DMRS.

The layer module 1225 may identify a number of layers associated with the second downlink transmission. In some cases, a second number of layers associated with the first downlink transmission is different than the number of layers associated with the second downlink transmission.

The rate matcher 1230 may rate matching the second downlink transmission based on the first set of DMRS.

Figure 13:
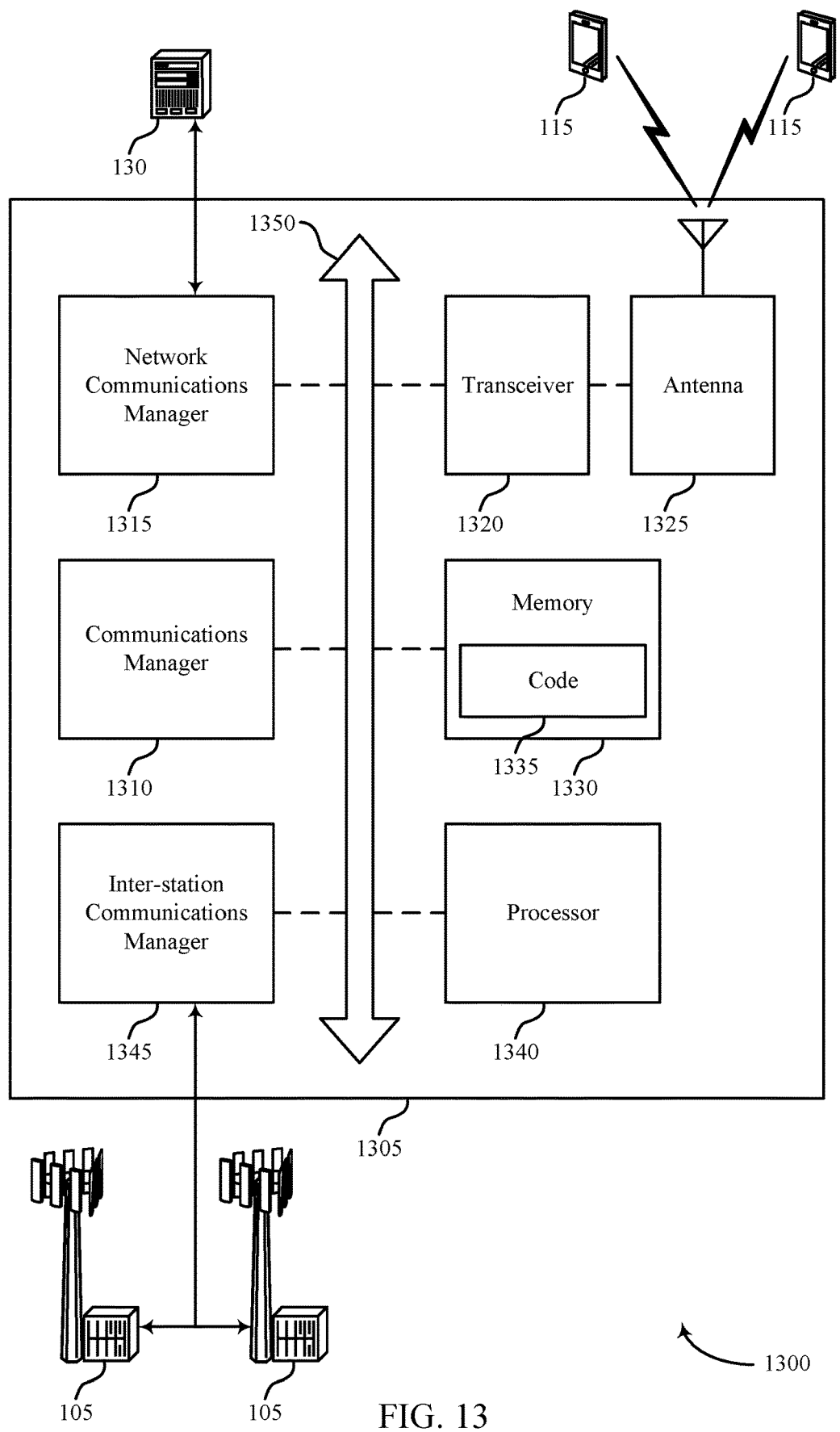
FIG. 13 shows a diagram of a system including a device that supports downlink DMRS sharing for sTTIs in accordance with aspects of the present disclosure.

FIG. 13 shows a diagram of a system 1300 including a device 1305 that supports downlink DMRS sharing for sTTIs in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345.

These components may be in electronic communication via one or more buses (e.g., bus 1350).

The communications manager 1310 may transmit a first downlink transmission in a first sTTI, transmit the second downlink transmission in the second sTTI, and determine a DMRS configuration for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting downlink demodulation reference signal sharing for short transmission time intervals).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
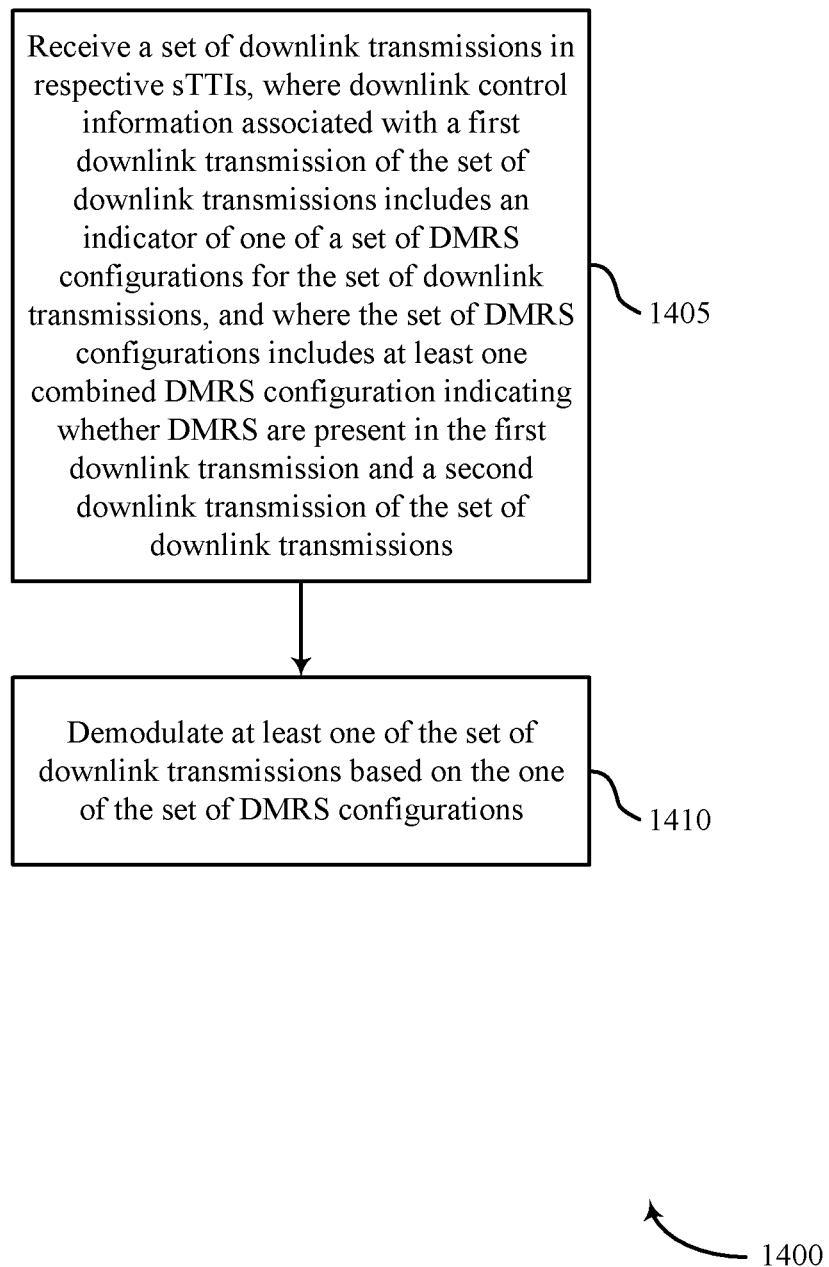
FIGS. 14 through 16 show flowcharts illustrating methods for downlink DMRS sharing for sTTIs in accordance with aspects of the present disclosure.

FIG. 14 shows a flowchart illustrating a method 1400 for downlink DMRS sharing for sTTIs in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive a plurality of downlink transmissions in respective sTTIs, where downlink control information associated with a first downlink transmission of the plurality of downlink transmissions may include an indicator of one of a plurality of DMRS configurations for the plurality of downlink transmissions, and where the plurality of DMRS configurations may include at least one combined DMRS configuration indicating whether DMRS are present in the first downlink transmission and a second downlink transmission of the plurality of downlink transmissions. The operations of 1405 may be performed according to the methods described herein. In certain examples, aspects of the operations of 1405 may be performed by an sTTI manager as described with reference to FIGS. 6 through 9.

At 1410 the UE 115 may demodulate at least one of the plurality of downlink transmissions based on the one of the plurality of DMRS configurations. The operations of 1410 may be performed according to the methods described herein. In certain examples, aspects of the operations of 1410 may be performed by a demodulator as described with reference to FIGS. 6 through 9.

Figure 15:
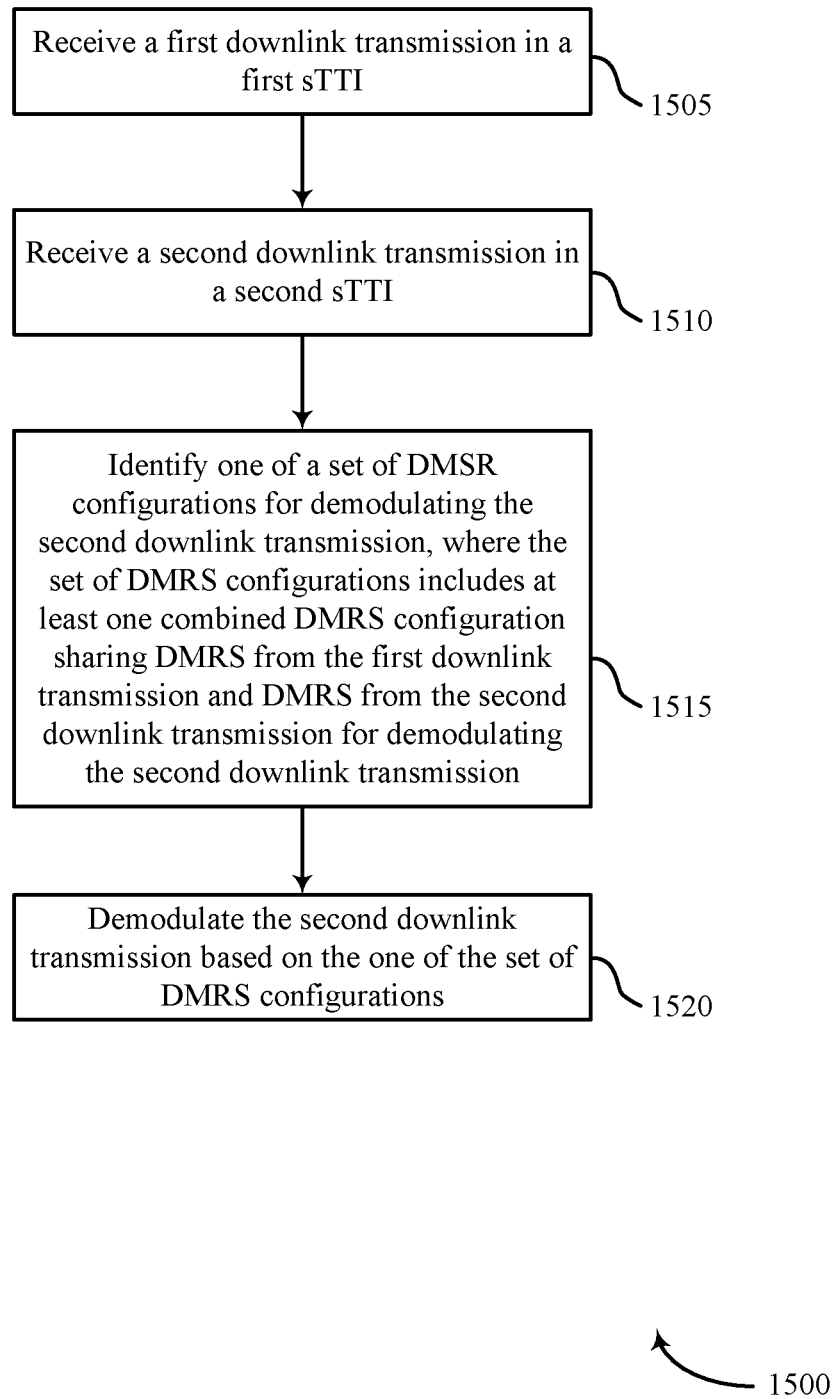

FIG. 15 shows a flowchart illustrating a method 1500 for downlink DMRS sharing for sTTIs in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a first downlink transmission in a first sTTI. The operations of 1505 may be performed according to the methods described herein. In some examples, aspects of the operations of 1505 may be performed by an sTTI manager as described with reference to FIGS. 6 through 9.

At 1510, the UE may receive a second downlink transmission in a second sTTI. The operations of 1510 may be performed according to the methods described herein. In some examples, aspects of the operations of 1510 may be performed by an sTTI manager as described with reference to FIGS. 6 through 9.

At 1515, the UE may identify one of a set of DMRS configurations for demodulating the second downlink transmission, where the set of DMRS configurations includes at least one combined DMRS configuration sharing DMRS from the first downlink transmission and DMRS from the second downlink transmission for demodulating the second downlink transmission. The operations of 1515 may be performed according to the methods described herein. In some examples, aspects of the operations of 1515 may be performed by a DMRS configuration manager as described with reference to FIGS. 6 through 9.

At 1520, the UE may demodulate the second downlink transmission based on the one of the set of DMRS configurations. The operations of 1520 may be performed according to the methods described herein. In some examples, aspects of the operations of 1520 may be performed by a demodulator as described with reference to FIGS. 6 through 9.

Figure 16:
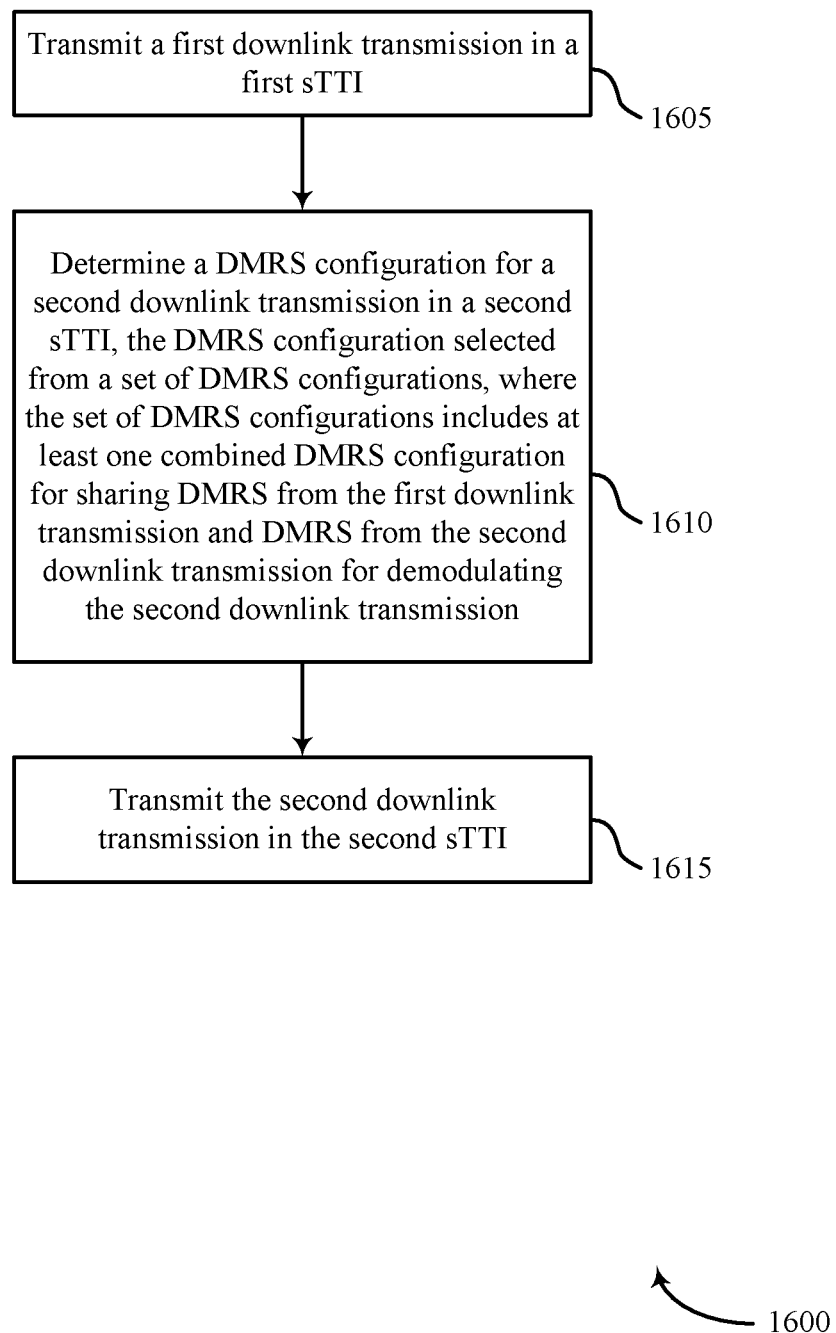

FIG. 16 shows a flowchart illustrating a method 1600 for downlink DMRS sharing for sTTIs in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit a first downlink transmission in a first sTTI. The operations of 1605 may be performed according to the methods described herein. In some examples, aspects of the operations of 1605 may be performed by an sTTI module as described with reference to FIGS. 10 through 13.

At 1610, the base station may determine a DMRS configuration for a second downlink transmission in a second sTTI, the DMRS configuration selected from a set of DMRS configurations, where the set of DMRS configurations includes at least one combined DMRS configuration for sharing DMRS from the first downlink transmission and DMRS from the second downlink transmission for demodulating the second downlink transmission. The operations of 1610 may be performed according to the methods described herein. In some examples, aspects of the operations of 1610 may be performed by a DMRS configuration module as described with reference to FIGS. 10 through 13.

At 1615, the base station may transmit the second downlink transmission in the second sTTI. The operations of 1615 may be performed according to the methods described herein. In some examples, aspects of the operations of 1615 may be performed by an sTTI module as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a first downlink transmission in a first short transmission time interval (sTTI);
    receiving downlink control information associated with a second downlink transmission comprising a demodulation reference signal (DMRS) indicator, wherein the DMRS indicator comprises a bit value to indicate whether DMRS is present in the second downlink transmission;
    receiving, at the UE from a wireless device, the second downlink transmission in a second sTTI, the second downlink transmission being received at the UE using a number of layers configured for communicating the second downlink transmission between the UE and the wireless device;
    identifying a first combined DMRS configuration for demodulating the second downlink transmission based at least in part on the number of layers being above a layer threshold and the bit value of the DMRS indicator, wherein the first combined DMRS configuration comprises sharing DMRS from the first downlink transmission for demodulating the second downlink transmission; and
    demodulating the second downlink transmission based at least in part on the first combined DMRS configuration.

2. The method of claim 1, wherein the first sTTI and the second sTTI comprise a DMRS sharing window.

3. The method of claim 2, wherein a number of downlink transmissions in the DMRS sharing window comprising DMRS is below a DMRS threshold.

4. The method of claim 1, wherein the first downlink transmission and the second downlink transmission are received in adjacent sTTIs, and wherein one of the first downlink transmission or the second downlink transmission comprises DMRS.

5. The method of claim 1, further comprising:
receiving, prior to receiving the second downlink transmission, a configuration selection indicator indicating a correspondence between the bit value for the DMRS indicator and a plurality of DMRS configurations.

6. The method of claim 5, wherein the correspondence between the bit value of the DMRS indicator and the first combined DMRS configuration is based at least in part on an sTTI index associated with the first downlink transmission.

7. The method of claim 5, wherein the correspondence between the bit value of the DMRS indicator and the first combined DMRS configuration is based at least in part on the number of layers.

8. The method of claim 5, wherein the first combined DMRS configuration corresponds to a presence of DMRS in the first downlink transmission and the second downlink transmission, the first sTTI occurring prior to the second sTTI, the method further comprising:
applying a second combined DMRS configuration based at least in part on an sTTI index associated with the second downlink transmission, the second combined DMRS configuration corresponding to a presence of DMRS in the second downlink transmission and a third downlink transmission corresponding to a third sTTI occurring prior to the second sTTI.

9. The method of claim 1, further comprising:
identifying the number of layers configured for communicating the second downlink transmission; and
determining a first set of DMRS associated with the number of layers based at least in part on the first combined DMRS configuration and DMRS in the first downlink transmission.

10. The method of claim 9, wherein a second number of layers associated with the first downlink transmission is different than the number of layers configured for communicating the second downlink transmission between the UE and the wireless device, and wherein the demodulating comprises:
performing channel estimation for the number of layers configured for communicating the second downlink transmission between the UE and the wireless device based at least in part on an energy per resource element power ratio between the first set of DMRS and data resource elements of the second downlink transmission that correspond to the number of layers configured for communicating the second downlink transmission between the UE and the wireless device.

11. The method of claim 10, wherein the energy per resource element ratio is one.

12. The method of claim 9, further comprising:
de-rating matching the second downlink transmission based at least in part on the first set of DMRS.

13. The method of claim 1, further comprising:
determining a first frequency resource allocation for the first downlink transmission;
determining a second frequency resource allocation for the second downlink transmission, wherein the second frequency resource allocation is different than the first frequency resource allocation; and identifying a first set of DMRS in the second downlink transmission based at least in part on the first combined DMRS configuration and frequency resources of the second frequency resource allocation that are exclusive of the first frequency resource allocation.

14. The method of claim 1, further comprising:
receiving a power ratio indicating a difference between an energy per resource element of a first set of DMRS in the first downlink transmission and an energy per resource element of a second set of DMRS in the second downlink transmission.

15. The method of claim 1, further comprising:
receiving an indication of the number of layers.

16. A method for wireless communication at a wireless device, comprising:
transmitting a first downlink transmission to a user equipment (UE) in a first short transmission time interval (sTTI);
determining a first combined demodulation reference signal (DMRS) configuration for the UE for a second downlink transmission in a second sTTI, wherein the first combined DMRS configuration comprises sharing DMRS from the first downlink transmission for demodulating the second downlink transmission, wherein determining the first combined DMRS configuration is based at least in part on a number of layers configured for communicating the second downlink transmission between the UE and the wireless device being above a layer threshold and a bit value for a DMRS indicator;
transmitting downlink control information associated with the second downlink transmission to the UE, the downlink control information comprising the DMRS indicator, wherein the bit value for the DMRS indicator indicates whether DMRS is present in the second downlink transmission; and
transmitting the second downlink transmission from the wireless device to the UE in the second sTTI using the number of layers.

17. The method of claim 16, wherein the first sTTI and the second sTTI comprise a DMRS sharing window.

18. The method of claim 17, wherein a number of downlink transmissions in the DMRS sharing window comprising DMRS is below a DMRS threshold.

19. The method of claim 17, wherein the first downlink transmission and the second downlink transmission are received in adjacent sTTIs, and wherein one of the first downlink transmission or the second downlink transmission comprises DMRS.

20. The method of claim 16, further comprising:
transmitting, prior to transmitting the second downlink transmission, a configuration selection indicator indicating a correspondence between the bit value for the DMRS indicator and a plurality of DMRS configurations.

21. The method of claim 20, wherein the correspondence between the bit value of the DMRS indicator and the first combined DMRS configuration is based at least in part on an sTTI index associated with the first downlink transmission.

22. The method of claim 20, wherein the correspondence between the bit value of the DMRS indicator and the first combined DMRS configuration is based at least in part on the number of layers.

23. The method of claim 20, wherein the first combined DMRS configuration corresponds to a presence of DMRS in the first downlink transmission and the second downlink transmission, the first sTTI occurring prior to the second sTTI, the method further comprising:
determining a second combined DMRS configuration based at least in part on an sTTI index associated with the second downlink transmission, the second combined DMRS configuration corresponding to a presence of DMRS in the second downlink transmission and a third downlink transmission corresponding to a third sTTI occurring prior to the second sTTI.

24. The method of claim 16, further comprising:
identifying the number of layers; and
determining a first set of DMRS associated with the number of layers based at least in part on a number of DMRS in the first downlink transmission.

25. The method of claim 24, wherein a second number of layers associated with the first downlink transmission is different than the number of layers configured for communicating the second downlink transmission between the UE and the wireless device.

26. The method of claim 24, further comprising:
rating matching the second downlink transmission based at least in part on the first set of DMRS.

27. The method of claim 16, further comprising:
determining a first frequency resource allocation for the first downlink transmission;
determining a second frequency resource allocation for the second downlink transmission, wherein the second frequency resource allocation is different than the first frequency resource allocation; and
identifying a first set of DMRS for the second downlink transmission based at least in part on frequency resources of the second frequency resource allocation that are exclusive of the first frequency resource allocation.

28. The method of claim 16, further comprising:
transmitting a power ratio indicating a difference between an energy per resource element of a first set of DMRS in the first downlink transmission and an energy per resource element of a second set of DMRS in the second downlink transmission.

29. The method of claim 16, further comprising:
transmitting an indication of the number of layers.

30. An apparatus for wireless communication at a user equipment (UE), comprising:
a processor,
memory coupled with the processor; and
instructions stored in the memory and executable by the processor to cause the apparatus to:
receive a first downlink transmission in a first short transmission time interval (sTTI);
receive downlink control information associated with a second downlink transmission comprising a demodulation reference signal (DMRS) indicator, wherein the DMRS indicator comprises a bit value to indicate whether DMRS is present in the second downlink transmission;
receive, at the UE from a wireless device, the second downlink transmission in a second sTTI, the second downlink transmission being received at the UE using a number of layers configured for communicating the second downlink transmission between the UE and the wireless device;
identify a combined DMRS configuration for demodulating the second downlink transmission based at least in part on the number of layers being above a layer threshold and the bit value of the DMRS indicator, wherein the first combined DMRS configuration comprises sharing DMRS from the first downlink transmission for demodulating the second downlink transmission; and
demodulate the second downlink transmission based at least in part on the first combined DMRS configuration.

31. An apparatus for wireless communication at a wireless device, comprising:
a processor,
memory coupled with the processor; and
instructions stored in the memory and executable by the processor to cause the apparatus to:
transmit a first downlink transmission to a user equipment (UE) in a first short transmission time interval (sTTI);
determine a first combined demodulation reference signal (DMRS) configuration for a second downlink transmission in a second sTTI, wherein the first combined DMRS configuration comprises sharing DMRS from the first downlink transmission for demodulating the second downlink transmission, wherein the first combined DMRS configuration is based at least in part on a number of layers configured for communicating the second downlink transmission between the UE and the wireless device being above a layer threshold and a bit value for a DMRS indicator;
transmit downlink control information associated with the second downlink transmission to the UE, the downlink control information comprising the DMRS indicator, wherein the bit value for the DMRS indicator indicates whether DMRS is present in the second downlink transmission; and
transmit the second downlink transmission from the wireless device to the UE in the second sTTI using the number of layers.

32. An apparatus for wireless communication at a user equipment (UE), comprising:
means for receiving a first downlink transmission in a first short transmission time interval (sTTI);
means for receiving downlink control information associated with a second downlink transmission comprising a demodulation reference signal (DMRS) indicator, wherein the DMRS indicator comprises a bit value to indicate whether DMRS is present in the second downlink transmission;
means for receiving, at the UE from a wireless device, the second downlink transmission in a second sTTI, the second downlink transmission being received at the UE using a number of layers configured for communicating the second downlink transmission between the UE and the wireless device;
means for identifying a combined DMRS configuration for demodulating the second downlink transmission based at least in part on the number of layers being above a layer threshold and the bit value of the DMRS indicator, wherein the first combined DMRS configuration comprises sharing DMRS from the first downlink transmission for demodulating the second downlink transmission; and
means for demodulating the second downlink transmission based at least in part on the first combined DMRS configuration.

33. An apparatus for wireless communication at a wireless device, comprising:

means for transmitting a first downlink transmission to a user equipment (UE) in a first short transmission time interval (sTTI);

means for determining a first combined demodulation reference signal (DMRS) configuration for a second downlink transmission in a second sTTI, wherein the first combined DMRS configuration comprises sharing DMRS from the first downlink transmission for demodulating the second downlink transmission, wherein the means for determining the first combined DMRS configuration is based at least in part on a number of layers configured for communicating the second downlink transmission between the UE and the wireless device being above a layer threshold and a bit value for a DMRS indicator;

means for transmitting downlink control information associated with the second downlink transmission to the UE, the downlink control information comprising the DMRS indicator, wherein the bit value for the DMRS indicator indicates whether DMRS is present in the second downlink transmission; and means for transmitting the second downlink transmission from the wireless device to the UE in the second sTTI using the number of layers.

34. A non-transitory computer-readable medium storing code for wireless communication at a user equipment (UE), the code comprising instructions executable by a processor to:

receive a first downlink transmission in a first short transmission time interval (sTTI);

receive downlink control information associated with a second downlink transmission comprising a demodulation reference signal (DMRS) indicator, wherein the DMRS indicator comprises a bit value to indicate whether DMRS is present in the second downlink transmission;

receive, at the UE from a wireless device, second downlink transmission in a second sTTI, the second downlink transmission being received at the UE using a number of layers configured for communicating the second downlink transmission between the UE and the wireless device;

identify a combined DMRS configuration for demodulating the second downlink transmission based at least in part on the number of layers being above a layer threshold and the bit value of the DMRS indicator, wherein the first combined DMRS configuration comprises sharing DMRS from the first downlink transmission for demodulating the second downlink transmission; and demodulate the second downlink transmission based at least in part on the first combined DMRS configuration.

35. A non-transitory computer-readable medium storing code for wireless communication at a wireless device, the code comprising instructions executable by a processor to:

transmit a first downlink transmission to a user equipment (UE) in a first short transmission time interval (sTTI);

determine a first combined demodulation reference signal (DMRS) configuration for a second downlink transmission in a second sTTI, wherein the first combined DMRS configuration comprises sharing DMRS from the first downlink transmission for demodulating the second downlink transmission, wherein the first combined DMRS configuration is based at least in part on a number of layers configured for communicating the second downlink transmission between the UE and the wireless device being above a layer threshold and a bit value for a DMRS indicator;

transmit downlink control information associated with the second downlink transmission to the UE, the downlink control information comprising the DMRS indicator, wherein the bit value for the DMRS indicator indicates whether DMRS is present in the second downlink transmission; and transmit the second downlink transmission from the wireless device to the UE in the second sTTI using the number of layers.

\* \* \* \* \*